United States Patent
Kondo et al.

(10) Patent No.: US 11,561,694 B2
(45) Date of Patent: Jan. 24, 2023

(54) ARITHMETIC PROCESSOR AND ARITHMETIC APPARATUS

(71) Applicant: FUJITSU LIMITED, Kawasaki (JP)

(72) Inventors: Yuji Kondo, Kawasaki (JP); Naozumi Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 17/241,117

(22) Filed: Apr. 27, 2021

(65) Prior Publication Data

US 2021/0382622 A1 Dec. 9, 2021

(30) Foreign Application Priority Data

Jun. 4, 2020 (JP) .............................. JP2020-097826

(51) Int. Cl.
*G06F 13/16* (2006.01)
*G06F 3/06* (2006.01)

(52) U.S. Cl.
CPC .......... *G06F 3/0604* (2013.01); *G06F 3/0659* (2013.01); *G06F 3/0673* (2013.01); *G06F 13/1615* (2013.01)

(58) Field of Classification Search
CPC .... G06F 3/0604; G06F 3/0659; G06F 3/0673; G06F 13/1615; G11C 7/1012; G11C 7/1036; G11C 7/1039; G11C 8/04
See application file for complete search history.

(56) References Cited

U.S. PATENT DOCUMENTS

| | | | | |
|---|---|---|---|---|
| 5,170,483 A | * | 12/1992 | Keryvel | G06F 15/8007 710/52 |
| 5,175,832 A | * | 12/1992 | Keryvel | G06F 13/1673 365/221 |
| 2010/0157717 A1 | * | 6/2010 | Lee | G11C 7/1078 365/189.12 |
| 2010/0166136 A1 | * | 7/2010 | Tobita | G11C 19/184 377/67 |
| 2011/0164460 A1 | * | 7/2011 | Kajigaya | G11C 11/409 365/194 |
| 2017/0115687 A1 | * | 4/2017 | Yokokura | G06F 1/12 |
| 2017/0116153 A1 | * | 4/2017 | Takada | G06F 9/3824 |

(Continued)

FOREIGN PATENT DOCUMENTS

JP 2005-190320 A 7/2005

*Primary Examiner* — Tracy A Warren
(74) *Attorney, Agent, or Firm* — Fujitsu Patent Center

(57) ABSTRACT

An arithmetic processor includes a memory access controller configured to control access of a memory based on a memory access request. The memory access controller includes a shift register configured to shift a resource number and a memory access request from a first stage to a subsequent stage of the first stage at a timing according to the operation mode, the first stage is received a resource number and a memory access request. The memory access controller includes a plurality of memory access transmitting circuits configured to receive the resource number and the memory access request held by the plurality of stage. Each of the plurality of access transmitting circuits provided corresponding to the plurality of resource number, and output, to the memory, an access command corresponding to the memory access request when the received resource number matches a resource number of a memory access transmitting circuit.

12 Claims, 19 Drawing Sheets

(56) References Cited

U.S. PATENT DOCUMENTS

2017/0153995 A1* 6/2017 Kim .................... G06F 13/4068
2019/0004855 A1* 1/2019 Hirao .................. G06F 13/1689
2019/0244655 A1* 8/2019 Penney ............... G11C 11/4096

* cited by examiner

ARITHMETIC PROCESSOR AND ARITHMETIC APPARATUS

CROSS-REFERENCE TO RELATED APPLICATION

This application is based upon and claims the benefit of priority of the prior Japanese Patent Application No. 2020-97826, filed on Jun. 4, 2020, the entire contents of which are incorporated herein by reference.

FIELD

The embodiment discussed herein is related to an arithmetic processor and arithmetic apparatus.

BACKGROUND

For example, an interface circuit that performs data communication between a processor and a memory includes a storage that stores requests sequentially received from the processor, and sequentially outputs the requests stored in the storage to the memory by pipeline processing. As a result, the interface circuit may output a subsequent request to the memory before the processing of the preceding read request is complete, for example (e.g., see Japanese Laid-open Patent Publication No. 2005-190320).

Japanese Laid-open Patent Publication No. 2005-190320 is disclosed as related art.

For example, in a memory such as a synchronous dynamic random access memory (SDRAM), Column to Column Delay Long (tCCDL) is defined as the minimum supply interval of read commands to be supplied to the same bank. The tCCDL (the number of dock cycles) increases as the operating frequency of the memory increases.

In order to achieve high-throughput memory access, the read command is preferably supplied to the memory at intervals at which read data can be continuously output from the memory. Furthermore, in a case where the intervals of the read data output from the memory in response to a plurality of consecutive read commands are spaced apart, a plurality of banks operates in parallel and the read commands are alternately supplied, whereby the read data may be continuously output from the memory.

For example, an access command such as an active command and a read command to be output to the memory is generated based on the timing at which a memory access request arrives at a predetermined stage in a shift register that sequentially shifts the memory access request. In the case of operating a plurality of banks in parallel, shift registers of the number corresponding to the maximum number of parallels in the case of operating the memory at the maximum operating frequency are required. Meanwhile, in a case where the operating frequency is low and the number of parallels is small, there are unnecessary shift registers that do not operate.

In one aspect, the embodiment aims to reduce a circuit scale of an arithmetic processor including a memory access controller capable of changing the number of parallels of access commands to be output to a memory.

SUMMARY

According to an aspect of the embodiments, an arithmetic processor includes: a processor configured to executes calculation; and a memory access controller configured to control access of a memory based on a memory access request output by the processor, wherein the memory access controller includes: a memory access receiving circuit configured to output, at a time interval according to an operation mode, a first shift signal, any of a plurality of resource numbers, and the memory access request received from the processor, a shift register configured to shift the resource number and the memory access request from a first stage included in a plurality of stages to a second stage as a subsequent stage of the first stage at a timing according to the operation mode, the first stage is received based on the first shift signal the resource number and the memory access request, and a plurality of memory access transmitting circuits configured to receive the resource number and the memory access request held by the plurality of stage, wherein each of the plurality of memory access transmitting circuits provided corresponding to the plurality of resource number, and the plurality of memory access transmitting circuits output, to the memory, an access command corresponding to the memory access request when the received resource number matches a resource number of a memory access transmitting circuits included in the plurality of memory access transmitting circuits.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an embodiment will be described with reference to the accompanying drawings.

Figure 1:
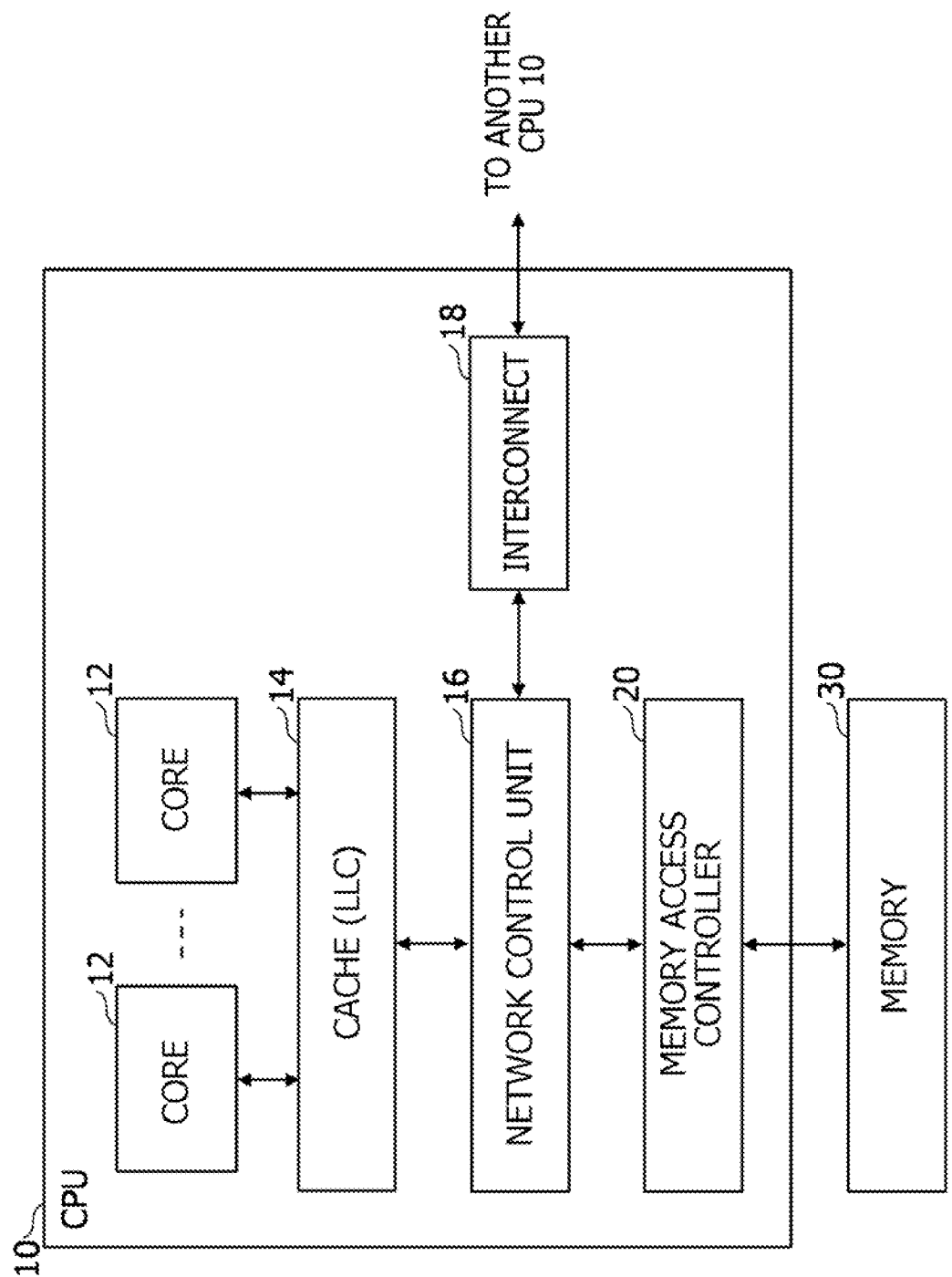
FIG. 1 is a block diagram illustrating an exemplary arithmetic processor including a memory access controller according to an embodiment.

FIG. 1 illustrates an exemplary arithmetic processor including a memory access controller according to an embodiment. An arithmetic processor 10 illustrated in FIG. 1 is, for example, a central processing unit (CPU). Hereinafter, the arithmetic processor 10 will also be referred to as a CPU 10.

The CPU 10 includes a plurality of cores 12, a cache 14, a network control unit 16, an interconnect 18, and a memory access controller 20. Each of the cores 12 executes a command stored in the cache 14, and executes an operation on data stored in the cache 14. Each of the cores 12 is an exemplary calculation unit.

For example, the cache 14 is a last level cache (LLC), and is commonly connected to the plurality of cores 12. The cache 14 is capable of storing a part of data and commands stored in a memory 30, such as a main memory, and a part of data and commands stored in a memory connected to another CPU 10. Although not particularly limited, the memory 30 is a double data rate 4 synchronous dynamic random access memory (DDR4 SDRAM). The network control unit 16 connects the cache 14, the interconnect 18, and the memory access controller 20 to each other. The interconnect 18 is connected to another CPU 10, and communicates with the other CPU 10.

The memory access controller 20 is connected to the memory 30, and controls the access of the memory 30. For example, the memory access controller 20 controls the access of the memory 30 based on a memory access request (MREQ in FIG. 2) output by the cache 14 of its own CPU 10 or another CPU 10. For example, in a case where the memory access request is a read access request, the memory access controller 20 performs a read access on the memory 30 to reads data stored in the memory 30 on the basis of the read access request.

Furthermore, when the memory access request is a write access request, the memory access controller 20 performs a write access on the memory 30 to write data on the memory 30 based on the write access request. Although not particularly limited, data of 256 bytes is read or data of 256 bytes is written in response to one memory access request.

Note that the number of the cores 12 to be mounted on the CPU 10 may be one. Furthermore, the CPU 10 does not necessarily have to include the cache 14 and the network control unit 16, and in that case, each of the cores 12 is connected to the memory access controller 20.

Figure 2:
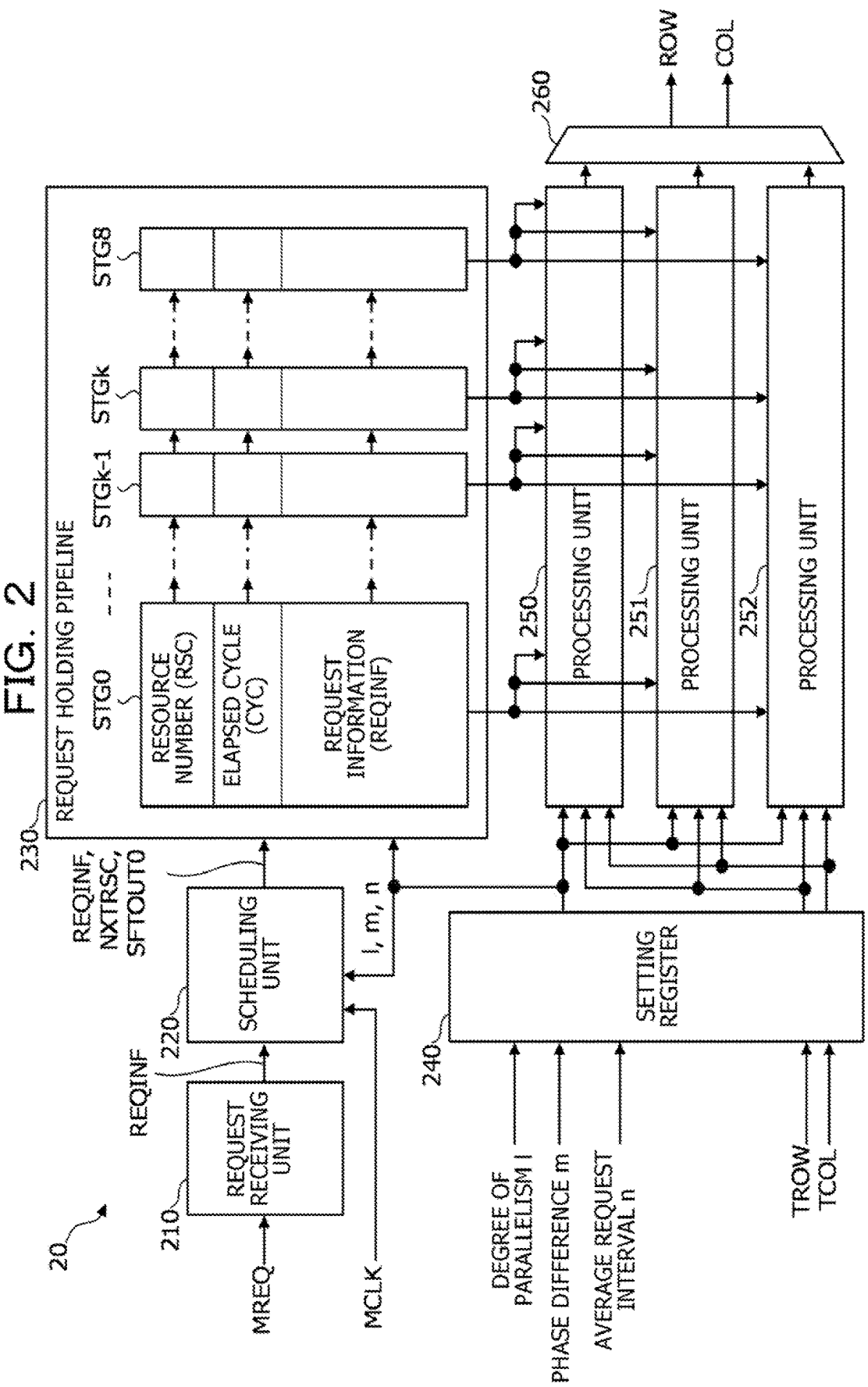
FIG. 2 is a block diagram illustrating an example of the memory access controller of FIG. 1.

FIG. 2 illustrates an example of the memory access controller 20 of FIG. 1. The memory access controller 20 includes a request receiving unit 210, a scheduling unit 220, a request holding pipeline 230, a setting register 240, a plurality of processing units 25 (250, 251, 252), and a selector 260.

The request receiving unit 210 outputs, to the scheduling unit 220, request information REQINF included in the memory access request MREQ received from the network control unit 16 (FIG. 1). For example, the request information REQINF includes an operation type (write or read), a bank address, a row address, a column address, a valid flag, and the like.

The scheduling unit 220 operates in synchronization with a memory clock MCLK, which is a clock to be supplied to the memory 30. Note that the memory dock MCLK is supplied not only to the scheduling unit 220 but also to a clock synchronization circuit in the memory access controller 20. The scheduling unit 220 outputs, together with the request information REQINF, a resource number NXTRSC and a shift signal SFTOUT0 based on a degree of parallelism I, a phase difference m, and an average request interval n set in the setting register 240.

The degree of parallelism I represents a degree of parallelism of a memory access, and indicates the number of the processing units 25 (250, 251, 252) that operate in parallel and control the access of the memory 30, which is an exemplary operation mode. The phase difference m represents the minimum supply interval of an active command ACT to be supplied to the memory 30 (the number of cycles of the memory dock MCLK), and differs depending on the degree of parallelism I (the number of operations of the processing unit 25).

The average request interval n represents the average supply interval of the active command ACT (the number of cycles of the memory clock MCLK). The resource number NXTRSC is a number for identifying the processing unit 25 that generates access commands such as an active command ACT and a read command RD, and "0" indicates the processing unit 250, "1" indicates the processing unit 251, and "2" indicates the processing unit 252.

Note that the scheduling unit 220 may determine the output order of the request information REQINF from the request receiving unit 210 to the memory 30 to improve the access efficiency of the memory 30. In this case, the scheduling unit 220 outputs the request information REQINF to the request holding pipeline 230 according to the determined order.

Figure 3:
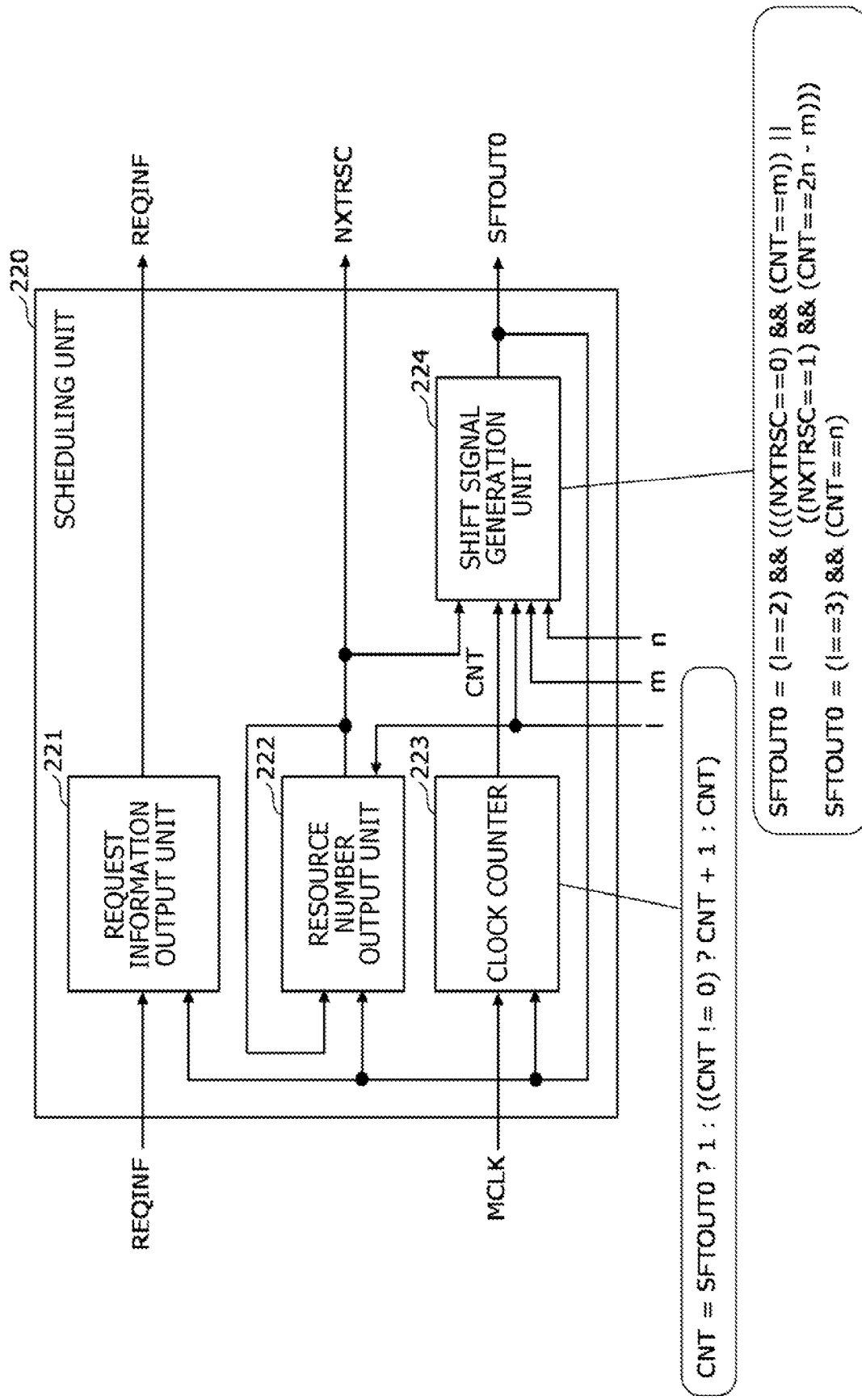
FIG. 3 is a block diagram illustrating an exemplary scheduling unit of FIG. 2.
Figure 7:
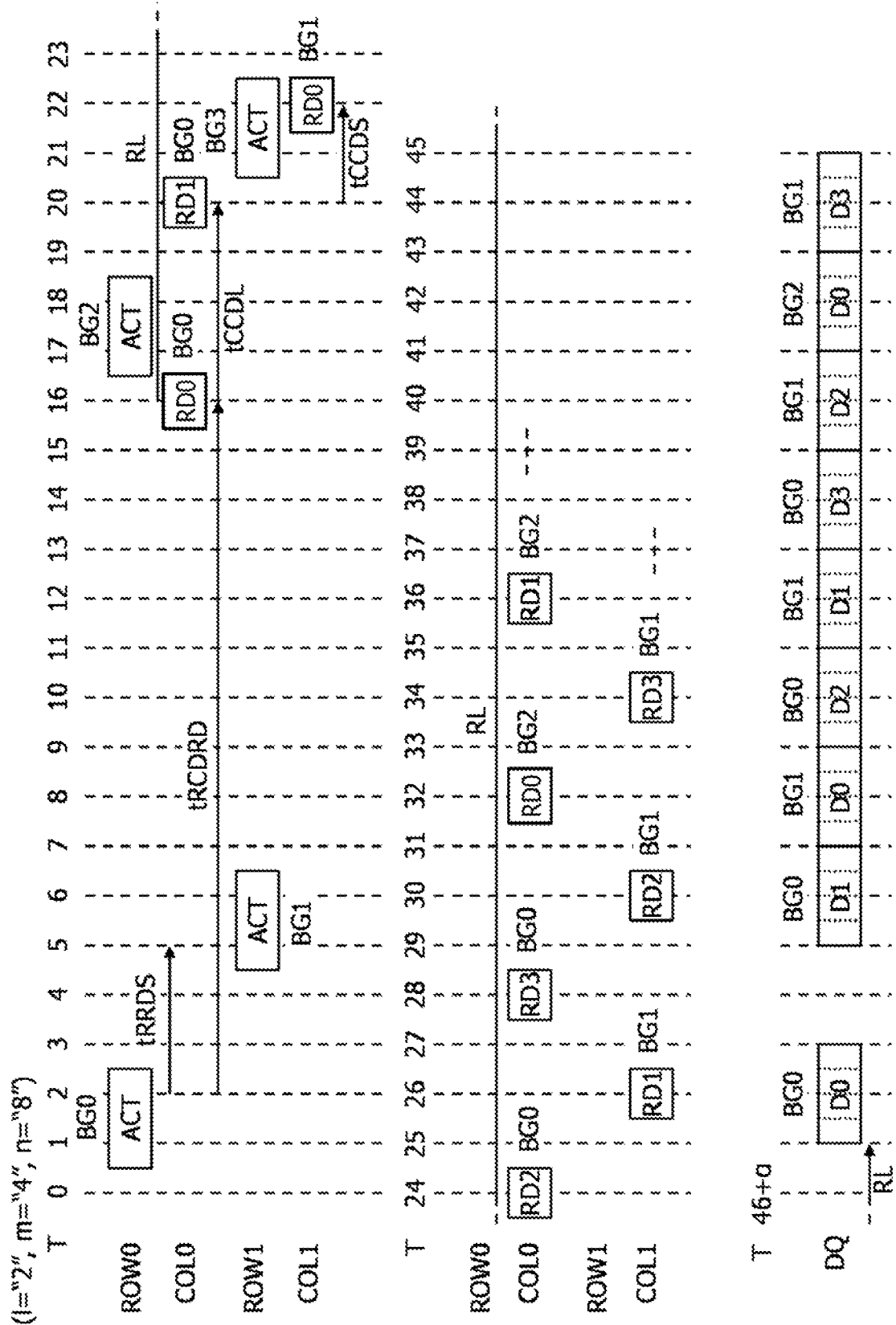
FIG. 7 is a timing chart illustrating an exemplary read access to a memory using the memory access controller of FIG. 2.

An example of the scheduling unit 220 is illustrated in FIG. 3, and examples of the active command ACT and the read command RD are illustrated in FIG. 7 and subsequent drawings. For example, the active command ACT is output to select any of a plurality of word lines included in the memory 30, and the read command RD is output to select the predetermined number of a plurality of memory cells connected to the selected word line.

As will be described later, the degree of parallelism I is changed according to an operating frequency of the memory 30. The scheduling unit 220 is an exemplary memory access receiving unit that outputs, at time intervals according to the operation mode, the shift signal SFTOUT0, any of a plurality of resource numbers RSC, and the memory access request MREQ received from the core 12.

The request holding pipeline 230 includes a plurality (nine in this example) of stages STGs (STG0 to STG8) connected in series that operate based on the shift signal SFTOUT0. Each stage STG includes a holding area for holding the resource number NXTRSC (hereinafter also simply referred to as resource number RSC), an elapsed cycle CYC, and the request information REQINF. For example, the elapsed cycle CYC is indicated by the number of clock cycles of the memory dock MCLK. A shift of Information between adjacent stages STGs is performed in synchronization with a shift input signal SFTIN to be described with reference to FIG. 5.

Figure 5:
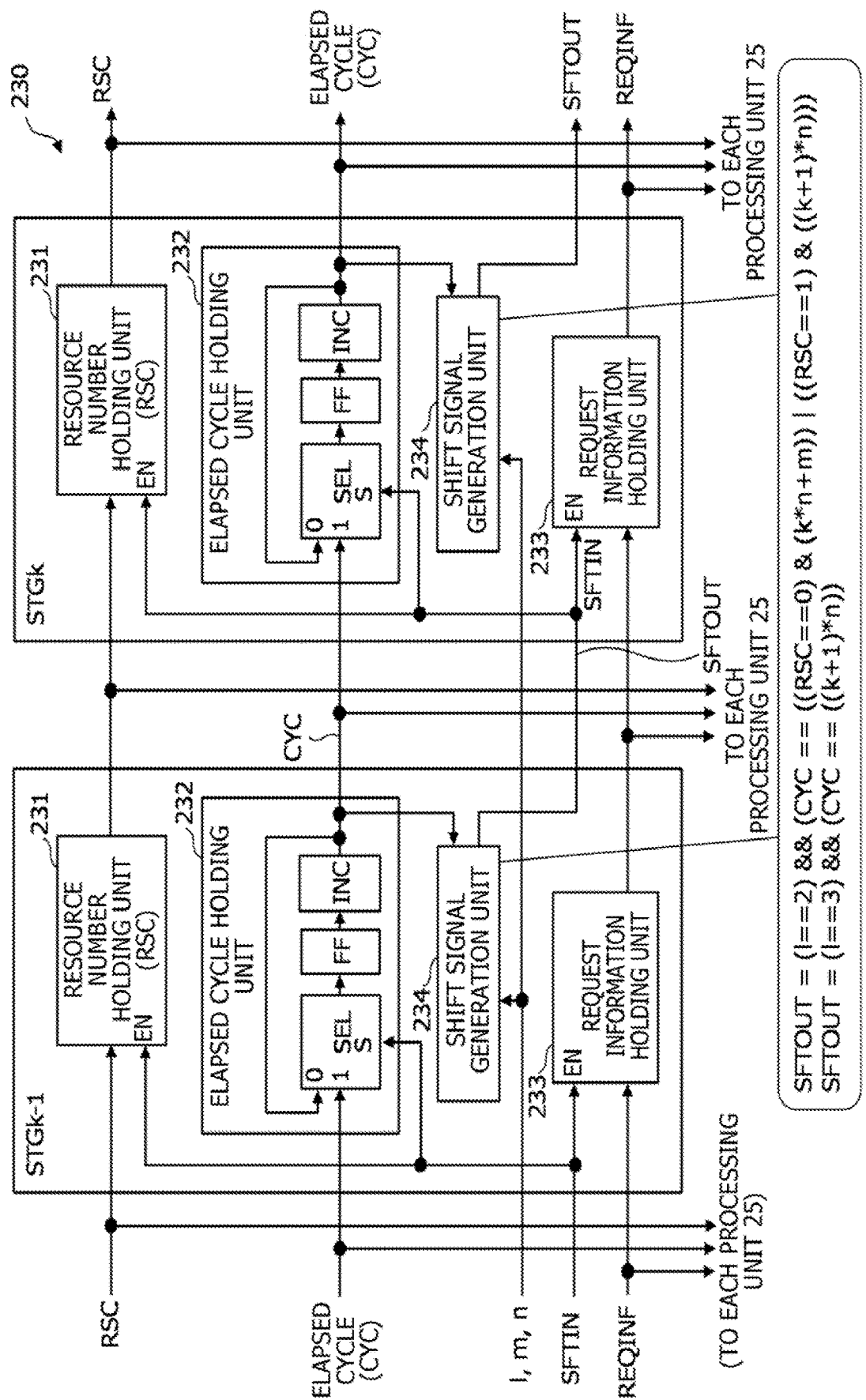
FIG. 5 is a block diagram illustrating an exemplary stage of a request holding pipeline of FIG. 2.

The request holding pipeline 230 operates as a shift register that shifts the resource number RSC, the elapsed cycle CYC, and the memory access request REQINF from the first stage STG0 to the subsequent stages STG1 to STG8 at a timing according to the operation mode. However, the request holding pipeline 230 is different from a normal shift register in that the period (number of cycles) during which the stage STG holds information changes according to the degree of parallelism I and the resource number RSC. An example of each stage STG of the request holding pipeline 230 is illustrated in FIG. 5.

The setting register 240 includes a register in which each of the degree of parallelism I, the phase difference m, the average request interval n, a row timing TROW, and a column timing TCOL is set. For example, the degree of parallelism I, the phase difference m, the average request interval n, the row timing TROW, and the column timing TCOL are set in the setting register 240 during execution of an initialization program of the CPU 10 according to the specifications of the memory 30. The degree of parallelism I, the phase difference m, and the average request interval n are supplied to each of the processing units 25 and the scheduling unit 220. The row timing TROW and the column timing TCOL are supplied to each of the processing units 25.

Each of the processing units 25 (250, 251, 252) outputs a plurality of access commands to the memory 30 based on information including the request information REQINF (memory access request) output from each stage STG of the request holding pipeline 230. The plurality of access commands are output to the memory 30 as a row control signal ROW and a column control signal COL. The row control signal ROW includes an active command ACT, a bank address, and a row address. The column control signal COL includes a read command RD (or write command), a bank address, and a column address.

Figure 6:
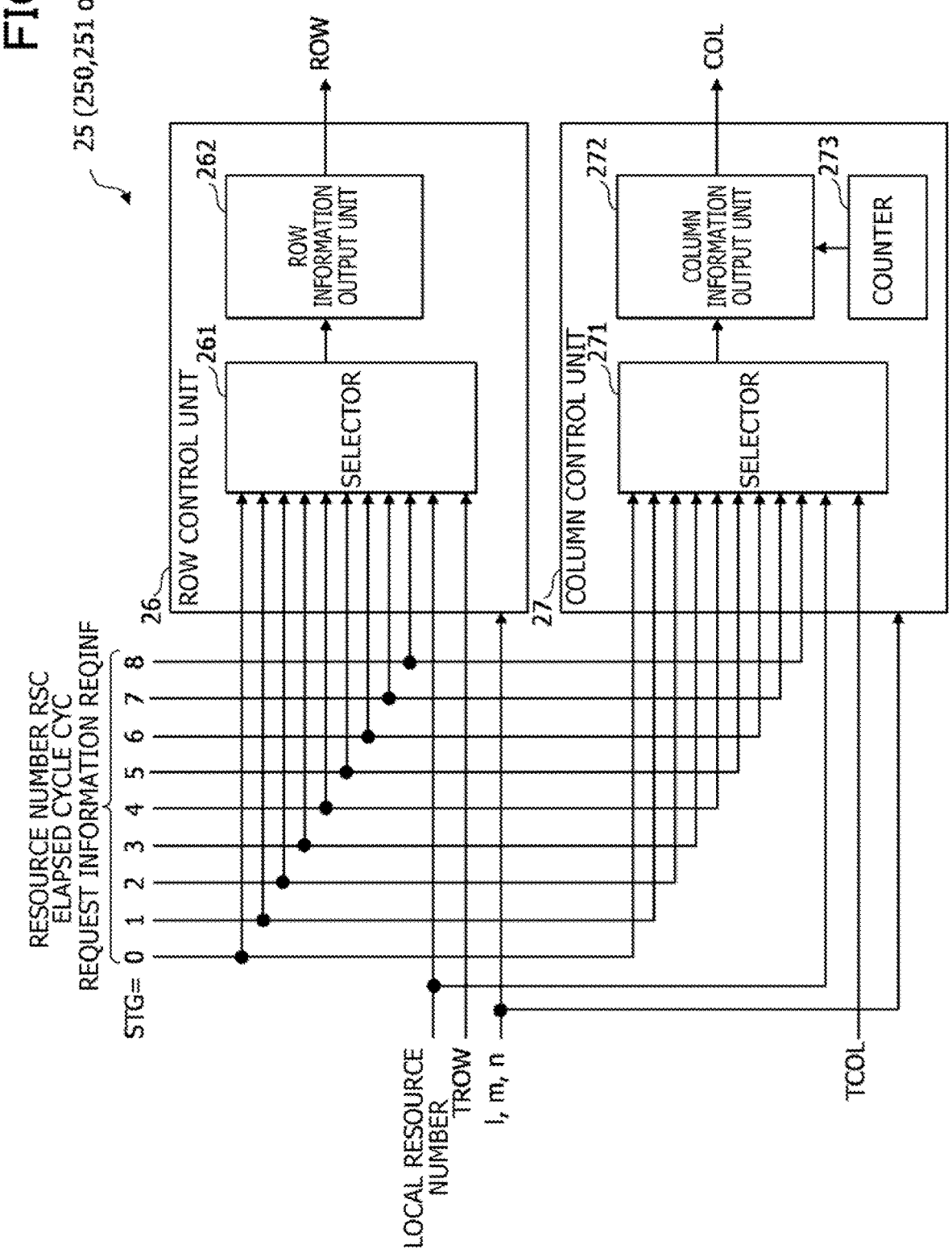
FIG. 6 is a block diagram illustrating an exemplary processing unit of FIG. 2.

For example, each of the processing units 25 outputs, using the request information REQINF, the row control signal ROW or the column control signal COL based on the elapsed cycle CYC output by the stage STG that holds the resource number RSC indicating its own processing unit 25. When the degree of parallelism I=2, the processing units 250 and 251 operate, and the processing unit 252 stops operating. When the degree of parallelism I=3, the processing units 250, 251, and 252 operate. Each of the processing units 25 is an exemplary memory access transmitting unit that sequentially outputs a plurality of access commands ACT and RD to the memory 30 in response to the memory access request MREQ. An example of the processing unit 25 is illustrated in FIG. 6.

The selector 260 selects the row control signal ROW and the column control signal COL output by each of the processing units 25, and outputs them to the memory 30. Note that the selector 260 may be designed based on the logic of an OR circuit.

FIG. 3 illustrates an example of the scheduling unit 220 of FIG. 2. The scheduling unit 220 includes a request information output unit 221, a resource number output unit 222, a dock counter 223, and a shift signal generation unit 224. The request information output unit 221 is an exemplary request output unit, and the shift signal generation unit 224 is an exemplary first shift signal generation unit.

The request information output unit 221 sequentially holds the request information REQINF received from the request receiving unit 210, and sequentially outputs, to the request holding pipeline 230, the held request information REQINF in synchronization with the shift signal SFTOUT0.

The resource number output unit 222 sequentially generates and outputs the resource number NXTRSC indicating the processing units 25 (250, 251, 252) that generates the access command to be output to the memory 30 using the request information REQINF. When the degree of parallelism I=2, the resource number output unit 222 alternately outputs "0" and "1" indicating the processing units 250 and 251 as the resource number NXTRSC in synchronization with the shift signal SFTOUT0. When the degree of parallelism I=3, the resource number output unit 222 alternately outputs "0", "1", and "2" indicating the processing units 250, 251, and 252 as the resource number NXTRSC in synchronization with the shift signal SFTOUT0.

Figure 8:
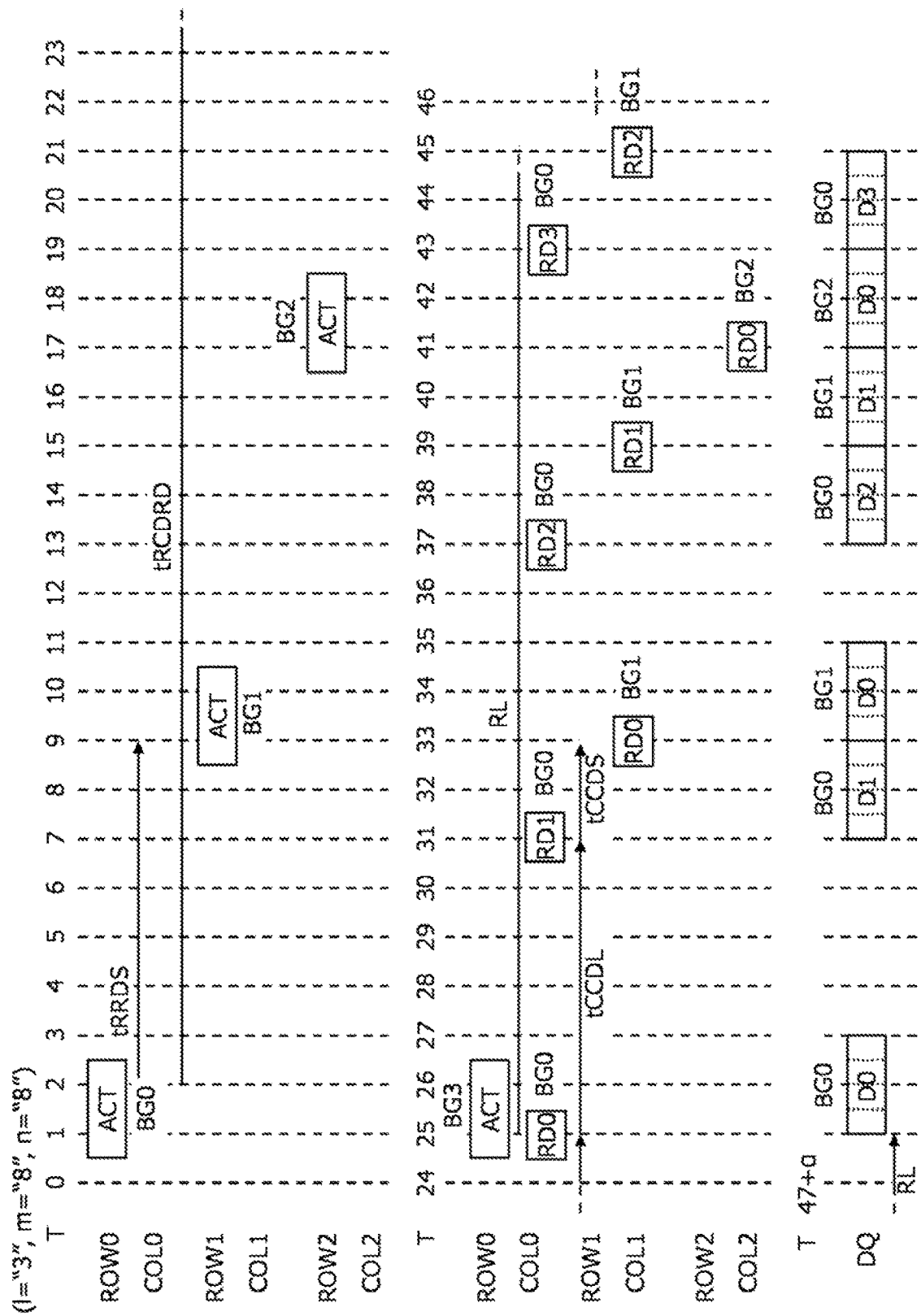
FIG. 8 is a timing chart illustrating another exemplary read access to a memory using the memory access controller of FIG. 2.

As a result, the resource number output unit 222 may operate as a counter that alternately generates the resource number NXTRSC with the "degree of parallelism I-1" set as the maximum value, and it becomes possible to differentiate the total number of the resource number NXTRSCs depending on the degree of parallelism I (operation mode). Since the resource number NXTRSC can be alternately output according to the degree of parallelism I, the request holding pipeline 230 may operate regardless of the setting of the degree of parallelism I. As a result, as illustrated in FIGS. 7 and 8, the memory access controller 20 may output an access command to the memory 30 at a timing corresponding to the degree of parallelism I.

The dock counter 223 generates a counter value CNT in synchronization with the memory dock MCLK, and outputs the generated counter value CNT to the shift signal generation unit 224. As expressed by the equation in the drawing, the dock counter 223 increments the counter value CNT in synchronization with the memory clock MCLK while no shift signal SFTOUT0 is output. Furthermore, the dock counter 223 resets the counter value CNT to "1" in response to the output of the shift signal SFTOUT0.

The shift signal generation unit 224 generates and outputs a shift signal SFTOUT0 at time intervals determined based on the resource number NXTRSC, the counter value CNT, the degree of parallelism I, the phase difference m, and the average request interval n. When the degree of parallelism I is "2" and "3", the output timing of the shift signal SFTOUT0 with the phase difference=m and the average request interval=n is expressed by the equations in the drawing.

When the degree of parallelism I=2 and the resource number NXTRSC=0, the shift signal generation unit 224 outputs the shift signal SFTOUT0 when the counter value CNT=m. When the degree of parallelism I=2 and the resource number NXTRSC=1, the shift signal generation unit 224 outputs the shift signal SFTOUT0 when the counter value CNT="2n-m". When the degree of parallelism I=3, the shift signal generation unit 224 outputs the shift signal SFTOUT0 every time the counter value CNT becomes "n".

Figure 4:
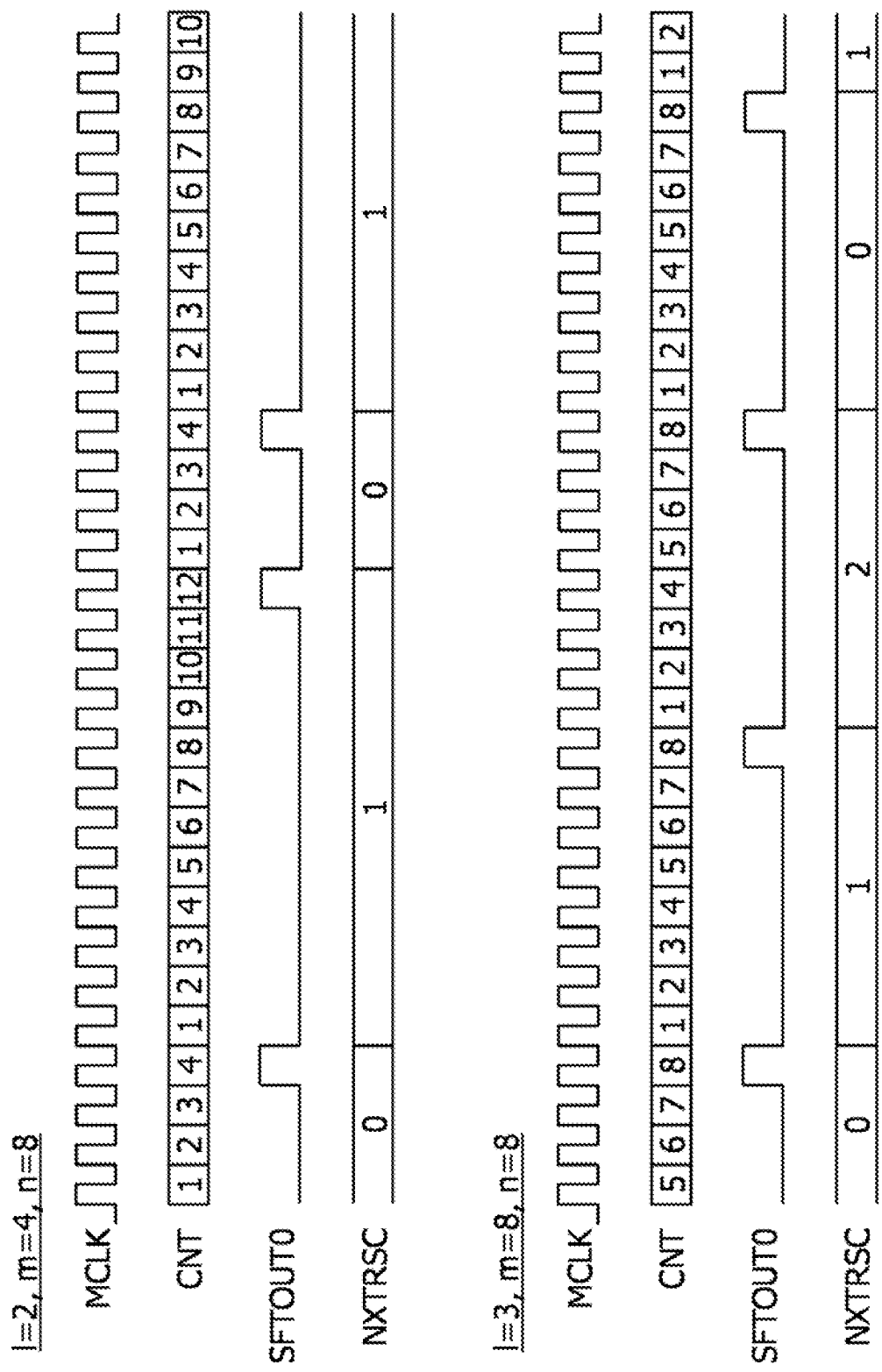
FIG. 4 is a timing chart illustrating exemplary operation of the scheduling unit of FIG. 3.

FIG. 4 illustrates exemplary operation of the scheduling unit 220 of FIG. 3. FIG. 4 illustrates an exemplary case where the degree of parallelism I=2, the phase difference m=4, and the average request interval n=8, and an exemplary case where the degree of parallelism I=3, the phase difference m=8, and the average request interval n=8.

When the degree of parallelism I=2, the scheduling unit 220 outputs the shift signal SFTOUT0 based on the clock counter 223 having counted "4" when the resource number NXTRSC=0. Furthermore, when the degree of parallelism I=2, the scheduling unit 220 outputs the shift signal SFTOUT0 based on the clock counter 223 having counted "12" when the resource number NXTRSC=1.

When the degree of parallelism I=3, the scheduling unit 220 outputs the shift signal SFTOUT0 on the basis of the clock counter 223 having counted "8" regardless of the resource number NXTRSC. Note that, as described with reference to FIG. 3, the counter value CNT is initialized to "1" in synchronization with the output of the shift signal SFTOUT0.

As illustrated in FIG. 4, the scheduling unit 220 may change the maximum value of the counter value CNT based on the degree of parallelism I, the phase difference m, and the average request interval n set according to the specifications of the memory 30 to be connected to the CPU 10, and the current resource number NXTRSC. In addition, the scheduling unit 220 may output the shift signal SFTOUT0 at a desired timing based on the counter value CNT whose maximum value is variable, and may update the resource number NXTRSC according to the output of the shift signal SFTOUT0.

FIG. 5 illustrates an exemplary stage STG of the request holding pipeline 230 of FIG. 2. Since the configurations of respective stages STGs are the same as each other, FIG. 5 illustrates two stages ((k−1)-th stage and k-th stage (k is an integer of 1 or more and 8 or less)). Each stage STG includes a resource number holding unit 231, an elapsed cycle holding unit 232, a request information holding unit 233, and a shift signal generation unit 234. The resource number holding unit 231 and the request Information holding unit 233 are examples of an access information holding unit that holds the resource number NXTRSC and the memory access request. The shift signal generation unit 234 is an exemplary second shift signal generation unit.

Note that the first stage STG0 receives the resource number RSC, the request information REQINF, and the shift signal SFTOUT0 output from the scheduling unit 220 of FIG. 3. The stage STG0 receives the shift signal SFTOUT0 from the scheduling unit 220 as a shift input signal SFTIN. The elapsed cycle CYC supplied to the stage STG0 is an elapsed cycle integrated with the reference time (="0") at which the request information REQINF is received from the scheduling unit 220, and is generated by a clock counter (not illustrated). Furthermore, Information input to the first stage STG0 is not supplied to each of the processing units 25.

While receiving a shift input signal SFTIN at a valid level (e.g., high level) with an enable terminal EN, the resource number holding unit 231 captures and holds the resource number RSC from the previous stage, and outputs the held resource number RSC to the subsequent stage STG and each of the processing units 25. The second and subsequent stages STGs operate by receiving, as a shift input signal SFTIN, the shift signal SFTOUT0 output by the previous stage STG. Note that the resource number holding unit 231 of the first stage STG0 sequentially receives the resource number NXTRSC (repetition of "0" and "1", or repetition of "0", "1", and "2") output by the resource number output unit 222 of the scheduling unit 220 of FIG. 3.

The elapsed cycle holding unit 232 includes a selector SEL, a flip-flop FF, and an incrementer INC. The selector SEL selects the elapsed cycle CYC from the previous stage while the shift input signal SFTIN is at a high level, and selects the elapsed cycle CYC from the incrementer INC while the shift input signal SFTIN is at a low level. Then, the selector SEL outputs the selected elapsed cycle CYC to the flip-flop FF.

The flip-flop FF captures the elapsed cycle CYC received from the selector SEL in synchronization with the memory dock MCLK (not illustrated), and outputs the captured elapsed cycle CYC to the incrementer INC. The incrementer INC increases the elapsed cycle CYC by "1", and returns the increased elapsed cycle CYC to the input of the selector SEL and also outputs it to the next stage STG and to each of the processing units 25.

The elapsed cycle holding unit 232 of each of the stages STG1 to STG8 of the second and subsequent stages holds the elapsed cycle CYC (number of cycles) held by the elapsed cycle holding unit 232 of the previous stage STG in synchronization with the shift signal SFTOUT output by the previous stage STG. Furthermore, the elapsed cycle holding unit 232 of each of the stages STG1 to STG8 sequentially updates the held number of cycles while the previous stage STG outputs no shift signal SFTOUT. Accordingly, the elapsed cycle holding unit 232 of each stage STG may hold the number of cycles since reception of the request information REQINF in the first stage STG0, and may output the held number of cycles to each of the processing units 25. As a result, each of the processing units 25 may determine the output timing of the access command to the memory 30 on the basis of the number of cycles from each stage STG.

The shift signal generation unit 234 generates, in accordance with the equation expressed in the drawing, a shift signal SFTOUT based on the degree of parallelism I, the phase difference m, the average request interval n, and the elapsed cycle CYC output by the elapsed cycle holding unit 232. The shift signal SFTOUT generated by the shift signal generation unit 234 is supplied to the next stage STG as a shift input signal SFTIN. In this manner, in a case where the elapsed cycle CYC becomes a value determined on the basis of the degree of parallelism I, the phase difference m, the average request interval n, and the position (=k) of its own stage STG, the shift signal generation unit 234 of each stage STG outputs the shift signal SFTOUT.

When the degree of parallelism I=2 and the resource number RSC held by the resource number holding unit 231 is "O", the shift signal generation unit 234 sets the shift signal SFTOUT to a valid level (e.g., high level) for the period of one cycle when the elapsed time is "k*n+m". The symbol "*" indicates the product. When the degree of parallelism I=2 and the resource number RSC held by the resource number holding unit 231 is "1", the shift signal generation unit 234 sets the shift signal SFTOUT to a valid level for the period of one cycle when the elapsed time is "(k+1)*n". In a case where the degree of parallelism I=3, the shift signal generation unit 234 sets the shift signal SFTOUT to a valid level for the period of one cycle when the elapsed time is "(k+1)*n".

Figure 10:
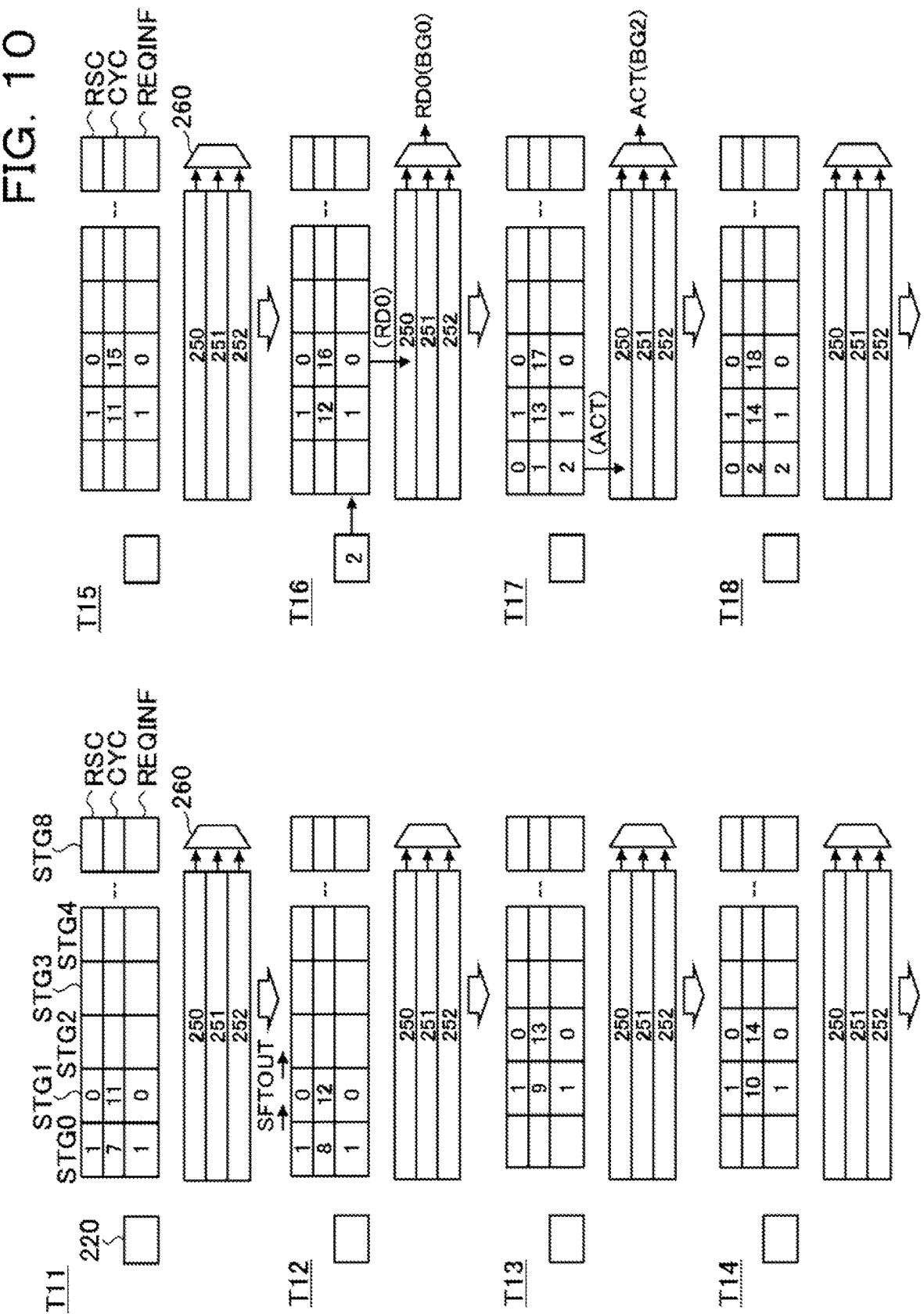
FIG. 10 is an explanatory diagram illustrating a continuation of FIG. 9.

For example, the shift signal generation unit 234 may change the output timing of the shift signal SFTOUT according to the degree of parallelism I, the phase difference m, the average request interval n, and the current resource number NXTRSC. Note that, the degree of parallelism I, the phase difference m, the average request interval n are set according to the specification of the memory 30 in advance. As a result, as will be described with reference to FIG. 10, it becomes possible to align the output timing of the shift signal SFTOUT of each stage STG and to suppress a malfunction of the request holding pipeline 230 even in a case where the supply interval of the active command ACT is not a fixed interval.

For example, it is assumed that the degree of parallelism I=2, the phase difference m=4, and the average request interval n=8. In this case, the first stage STG0 holding the resource number RSC=0 outputs the shift signal SFTOUT after four cycles from the reception of the request information REQINF. The second stage STG1 holding the resource number RSC=0 outputs the shift signal SFTOUT after 12 cycles from the reception of the request information REQINF. The third stage STG2 holding the resource number RSC=0 outputs the shift signal SFTOUT after 20 cycles from the reception of the request information REQINF.

Furthermore, the first stage STG0 holding the resource number RSC=1 outputs the shift signal SFTOUT after eight cycles from the reception of the request information REQINF. The second stage STG1 holding the resource number RSC=1 outputs the shift signal SFTOUT after 16 cycles from the reception of the request information REQINF. The third stage STG2 holding the resource number RSC=1 outputs the shift signal SFTOUT after 24 cycles from the reception of the request information REQINF.

Meanwhile, it is assumed that the degree of parallelism I=3, the phase difference m=8, and the average request interval n=8. In this case, the first stage STG0 outputs the shift signal SFTOUT after eight cycles from the reception of the request information REQINF. The second stage STG1 outputs the shift signal SFTOUT after 16 cycles from the reception of the request information REQINF. The third stage STG2 outputs the shift signal SFTOUT after 24 cycles from the reception of the request information REQINF.

The request information holding unit 233 captures and holds the request information REQINF from the previous stage while receiving the shift input signal SFTIN at a valid level with the enable terminal EN. The request information holding unit 233 outputs the captured request information REQINF to the next stage STG and to each of the processing units 25. The request information holding unit 233 of the first stage STG0 captures the request information REQINF output by the request information output unit 221 of the scheduling unit 220.

FIG. 6 illustrates an example of the processing units 25 (250, 251, 252) of FIG. 2. Each of the processing units 25 includes a row control unit 26 including a selector 261 and a row information output unit 262, and a column control unit 27 including a selector 271, a column information output unit 272, and a counter 273.

The selector 261 receives the resource number RSC, the elapsed cycle CYC, and the request information REQINF from each of the stages STG0 to STG8 of the request holding pipeline 230. Furthermore, the selector 261 receives the row timing TROW and the degree of parallelism I from the setting register 240.

The selector 261 selects the request information REQINF output from the stage STG that outputs the resource number RSC that matches its own resource number, which is an identification number of its own processing unit 25, and the elapsed cycle CYC that matches the cycle indicated by the row timing TROW. Then, the selector 261 outputs the selected request information REQINF to the row information output unit 262. The row information output unit 262 generates, responding to the request information REQINF received from the selector 261, a row control signal ROW using the request information REQINF, and outputs it to the memory 30.

The selector 271 receives the resource number RSC, the elapsed cycle CYC, and the request information REQINF from each of the stages STG0 to STG8 of the request holding pipeline 230. Furthermore, the selector 271 receives the column timing TCOL and the degree of parallelism I from the setting register 240.

The selector 271 selects the request Information REQINF output from the stage STG that outputs the resource number RSC that matches its own resource number, which is an identification number of its own processing unit 25, and the elapsed cycle CYC that matches the cycle indicated by the column timing TCOL. Then, the selector 271 outputs the selected request information REQINF to the column information output unit 272. The counter 273 counts the number of times of output of the column control signal COL. The column information output unit 272 generates, responding to the request information REQINF received from the selector 271, a column control signal COL using the request information REQINF, and outputs it to the memory 30. At this time, the column information output unit 272 outputs the column control signal COL of the number of times counted by the counter 273 every time a predetermined number of cycles have elapsed.

In this manner, each of the processing units 25 receives the resource number RSC, the elapsed cycle CYC, and the request information REQINF held by a plurality of stages STG of the request holding pipeline 230. Then, when the received resource number RSC matches its own resource number, each of the processing units 25 outputs, to the memory 30, an access command (active command ACT, read command RD, etc.) corresponding to the received request information REQINF. In other words, for example, when the number of cycles indicated by the elapsed cycle CYC held by the stage STG that outputs its own resource number RSC indicates the output cycle of the access command determined according to the degree of parallelism I, each of the processing units 25 outputs the corresponding access command to the memory 30. Therefore, even in a case where the output cycle of the access command is changed depending on the degree of parallelism I, the access command may be output to the memory 30 at the correct timing on the basis of the degree of parallelism I, the resource number RSC, and the elapsed cycle CYC.

FIG. 7 illustrates an exemplary read access to the memory 30 using the memory access controller 20 of FIG. 2. FIG. 7 illustrates exemplary operation of a case where the degree of parallelism I=2, the phase difference m=4, and the average request interval n=8. A row control signal ROW0 and a column control signal COL0 are output from the processing unit 250, and a row control signal ROW1 and a column control signal COL are output from the processing unit 251. It is assumed that the memory 30 has four bank groups BG0 to BG3. In FIG. 7, the numerical value sequentially increasing indicates the elapsed time T (integrated value of the number of cycles of the memory dock MCLK). Hereinafter, the elapsed time T will be referred to as time T0, T1, T2, and so on in combination with a numerical value.

First, at time T1, the processing unit 250 outputs an active command ACT to the bank group BG0. For example, the active command ACT is supplied to the memory 30 using two dock cycles. At time T5 which is time after RAS to RAS Delay (tRRDS) from output the active command ACT by the processing unit 250, the processing unit 251 outputs an active command ACT to the bank group BG1. The "tRRDS" is a specification of the minimum interval between active commands ACTs between different bank groups BGs.

At time T16 which is time after RAS to CAS Delay (tRCDRD) from the output of the active command ACT, the processing unit 250 outputs a first read command RD0 to the bank group BG0. Furthermore, since the average request interval n is "8" in the case of the degree of parallelism I=2, the processing unit 250 outputs the active command ACT to the bank group BG2 at time T17 which is time after 16 cycles from the first active command ACT. Moreover, at time T20 which is time after CAS to CAS Delay Long (tCCDL) from the output of the read command RD0, the processing unit 250 outputs a second read command RD1 to the bank group BG0. The "tCCDL" is a specification of the minimum interval between column commands (read commands RDs, etc.) in the same bank group BG.

Since the average request interval n is "8", the processing unit 251 outputs the active command ACT to the bank group BG3 at time T21 which is time after 16 cycles from the first active command ACT. Moreover, at time T22 which is time after CAS to CAS Delay Short (tCCDS) from output the read command RD1 by processing unit 250, the processing unit 251 outputs a first read command RD0 to the bank group BG1. The "tCCDS" is a specification of the minimum interval between column commands between different bank groups BGs.

Thereafter, the processing units 250 and 251 alternately output the read command RD every two cycles. The output interval of the read commands RDs by the respective processing units 250 and 251 is four cycles. Then, after the cycles corresponding to the read latency RL from when the processing unit 250 outputs the first read command RD0, the first read data D0 corresponding to the read command RD0 is output from the bank group BG0. In this example, since the burst length is set to "4", four data are read in synchronization with each of the rising edge and falling edge of the memory clock MCLK. Moreover, after the read latency RL has elapsed from each read command RD, the read data D (any of D0 to D3) is read from each bank group BG.

The operation illustrated in FIG. 7 is implemented by the scheduling unit 220 that outputs the shift signal SFTOUT0 and the request holding pipeline 230 that executes the shift operation of the stage STG according to the degree of parallelism I=2, the phase difference m=4, and the average request interval n=8. Accordingly, the memory access controller 20 may execute the read access operation with the degree of parallelism I=2 using the information sequentially transferred to the stage STG of the request holding pipeline 230 common to a plurality of degrees of parallelism I.

FIG. 8 illustrates another exemplary read access to the memory 30 using the memory access controller 20 of FIG. 2. Detailed description of operations and elements similar to those in FIG. 7 will be omitted. FIG. 8 illustrates exemplary operation of a case where the frequency of the memory clock MCLK (i.e., operating frequency of the memory 30) is higher than the frequency of the memory dock MCLK used for the operation of FIG. 7 with the setting of the degree of parallelism I=3, the phase difference m=8, and the average request interval n=8.

In the case of the degree of parallelism I=3, the processing units 250, 251, and 252 sequentially output active commands ACTs to different bank groups BG0, BG1, BG2, and BG3 at times T1, T9, T17, and T25 at intervals of eight cycles. At time T25 which is time elapsed tRCDRD from output the active command ACT to the bank group BG0, the processing unit 250 outputs a first read command RD0 to the bank group BG0. Note that the row control signal ROW and the column control signal COL illustrated in FIG. 2 are output to the memory 30 using different buses. Therefore, at time T25, the processing unit 250 may output the read command RD0 to the bank group BG0 together with the active command ACT to the bank group BG3.

At time T31 which is time after tCCDL from output the read command RD0 to the bank group BG0, the processing unit 250 outputs a second read command RD1 to the bank group BG0. Since the frequency of the memory clock MCLK of FIG. 8 is higher than the frequency of the memory clock MCLK of FIG. 7, the number of cycles of each of tRRDS, tRCDRD, and tCCDL is larger than that of each of those in FIG. 7.

At time T33 which is time after tCCDS from output the read command RD1 by the processing unit 250, the processing unit 251 outputs a first read command RD0 to the bank group BG1. Thereafter, in a similar manner to FIG. 7, the processing units 250, 251, and 252 alternately output the read command RD every two cycles. The output interval of the read commands RDs by the respective processing units 250, 251, and 252 is six cycles.

Then, after the read latency RL from when the processing unit 250 outputs the first read command RD0, the first read data D0 corresponding to the read command RD0 is read from the bank group BG0. Since the frequency of the memory dock MCLK of FIG. 8 is higher than the frequency of the memory clock MCLK of FIG. 7, the read latency RL is also larger than the read latency RL of FIG. 7. Then, in a similar manner to FIG. 7, after the read latency RL has elapsed from each read command RD, the read data D (any of D0 to D3) is read from each bank group BG.

The operation illustrated in FIG. 8 is implemented by the scheduling unit 220 that outputs the shift signal SFTOUT0 and the request holding pipeline 230 that executes the shift operation of the stage STG according to the degree of parallelism I=3, the phase difference m=8, and the average request interval n=8. Accordingly, the memory access controller 20 may execute the read access operation with the degree of parallelism I=3 using the information sequentially transferred to the stage STG of the request holding pipeline 230 common to a plurality of degrees of parallelism I.

As described above, according to this embodiment, it becomes possible to achieve the memory access with different degrees of parallelism I using one series of shift registers of the request holding pipeline 230, as illustrated in FIGS. 7 and 8. As a result, it becomes possible to reduce the circuit scale of the memory access controller 20, and to reduce the circuit scale of the CPU 10 equipped with the memory access controller 20 as compared with the case of using a plurality of series of shift registers.

Figure 9:
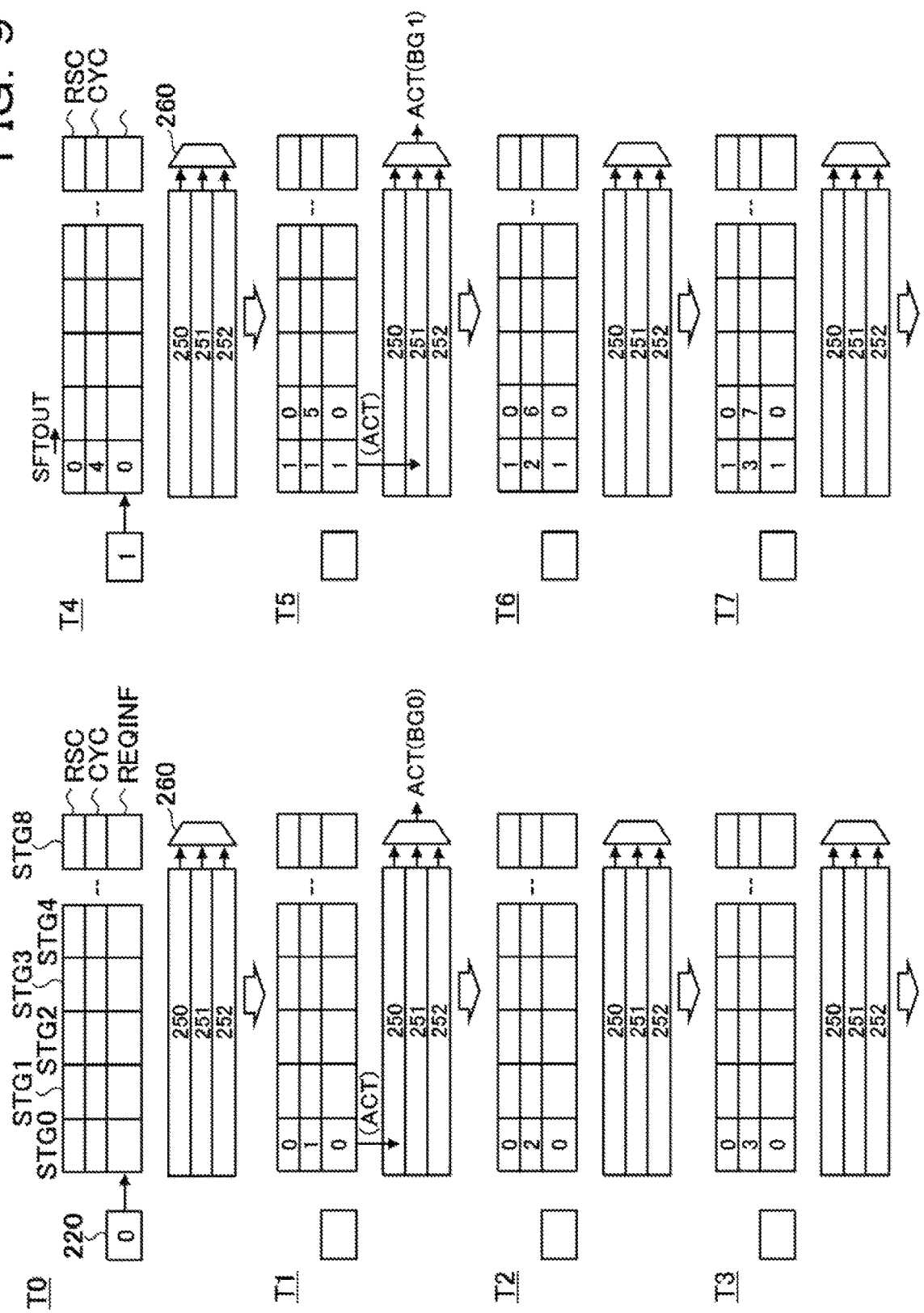
FIG. 9 is an explanatory diagram illustrating exemplary operation of the memory access controller in the read access of FIG. 7.

FIGS. 9 to 12 illustrate exemplary operation of the memory access controller 20 in the read access of FIG. 7. The operation illustrated in FIG. 9 is executed with the setting of the degree of parallelism I=2, the phase difference m=4, and the average request interval n=8. In the initial state, the scheduling unit 220 outputs the resource number RSC=0.

First, at time T0, the scheduling unit 220 outputs, to the request holding pipeline 230, the first read request 0, the resource number RSC=0 indicating the processing in the processing unit 250, and the shift signal SFTOUT0.

At time T1, the request information holding unit 233 of the stage STG0 holds the read request 0 as request information, and outputs the held read request 0 to the stage STG1 and to each of the processing units 25. The resource number holding unit 231 of the stage STG0 holds the resource number RSC=0, and outputs the held resource number RSC=0 to the stage STG1 and to each of the processing units 25. The elapsed cycle holding unit 232 increments the reference cycle number (="0") at the time of receiving the request information REQINF, holds the elapsed cycle CYC=1, and outputs the held elapsed cycle CYC=1 to the stage STG1 and to each of the processing units 25.

The processing unit 250 that has received the resource number RSC=0 indicating itself from the stage STG0 outputs the active command ACT to the memory 30 as the elapsed cycle CYC=1 matches the row timing TROW. The active command ACT is output to the bank group BG0 based on address information included in the read request 0.

At time T2 and time T3, since the stage STG0 does not receive the shift input signal SFTIN, the states of the request information holding unit 233 and the resource number holding unit 231 are held. The elapsed cycle holding unit 232 of the stage STG0 sequentially increments the elapsed cycle CYC to set it to "3".

At time T4, the scheduling unit 220 outputs, to the request holding pipeline 230, the second read request 1 and the resource number RSC=1 indicating the processing in the processing unit 251. Furthermore, since the counter value CNT is "4", the current resource number RSC is "0", and the conditional expression at the degree of parallelism I=2 illustrated in FIG. 3 is satisfied, the scheduling unit 220 outputs the shift signal SFTOUT0 to the stage STG0. Furthermore, since the elapsed cycle CYC of the stage STG0 is "4" and the conditional expression at the degree of parallelism I=2 illustrated in FIG. 5 is satisfied, the shift signal generation unit 234 of the stage STG0 outputs the shift signal SFTOUT.

At time T5, the request information holding unit 233 of the stage STG0 holds the read request 1 as request information. The resource number holding unit 231 of the stage STG0 holds the resource number RSC=1. The elapsed cycle holding unit 232 of the stage STG0 increments the received elapsed cycle CYC=0 and holds the elapsed cycle CYC=1.

The request information holding unit 233 of the stage STG1 holds the read request 0 from the stage STG0 in synchronization with the shift signal SFTOUT. The resource number holding unit 231 of the stage STG1 holds the resource number RSC=0 from the stage STG0 in synchronization with the shift signal SFTOUT. The elapsed cycle holding unit 232 of the stage STG1 increments the received elapsed cycle CYC=4 and holds the elapsed cycle CYC=5.

The processing unit 251 that has received the resource number RSC=1 indicating itself from the stage STG0 outputs the active command ACT to the bank group BG1 as the elapsed cycle CYC=1 matches the row timing TROW. Thereafter, from time T6 to time T11 in FIG. 10, since the stages STG0 and STG1 do not receive the shift input signal SFTIN, the states of the request information holding unit 233 and the resource number holding unit 231 are held. The elapsed cycle holding units 232 of the stages STG0 and STG1 sequentially increment the elapsed cycle CYC to set it to "7" and "11", respectively.

At time T12, the elapsed cycle CYC of the stage STG0 becomes "8", and the elapsed cycle CYC of the stage STG1 becomes "12". The shift signal generation unit 234 of each of the stages STG0 and STG1 outputs the shift signal SFTOUT as it satisfies the conditional expression at the degree of parallelism I=2 illustrated in FIG. 5. Accordingly, it becomes possible to align the output timing of the shift signal SFTOUT of each stage STG even in a case where the reception interval of the request Information REQINF (supply interval of the active command ACT in FIG. 7) of the stage STG0 is not a fixed interval. As a result, it becomes possible to suppress collision of the request information REQINF and the like in the request holding pipeline 230, and to suppress a malfunction even in a case where the reception interval of the request information REQINF in the stage STG0 is not a fixed interval.

Thereafter, from time T13 to time T16, since the stages STG1 and STG2 do not receive the shift input signal SFTIN, the states of the request information holding unit 233 and the resource number holding unit 231 are held. The elapsed cycle holding units 232 of the stages STG1 and STG2 sequentially increment the elapsed cycle CYC to set it to "12" and "16", respectively. The stage STG0 does not operate as it has not received the request information REQINF.

At time T16, the scheduling unit 220 outputs, to the request holding pipeline 230, the third read request 2 and the resource number RSC=0 indicating the processing in the processing unit 250. Furthermore, since the counter value CNT is "12", the current resource number RSC is "1", and the conditional expression at the degree of parallelism I=2 illustrated in FIG. 3 is satisfied, the scheduling unit 220 outputs the shift signal SFTOUT0 to the stage STG0.

At time T16, the processing unit 250 that has received the resource number RSC=0 indicating itself from the stage STG2 outputs the read command RD0 to the bank group BG0 as the elapsed cycle CYC=16 matches one of the column timing TCOLs. For example, four column timing TCOLs (CYC16, CYC20, CYC24, CYC28) are prepared corresponding to the read commands RD0, RD1, RD2, and RD3 illustrated in FIG. 7.

Figure 11:
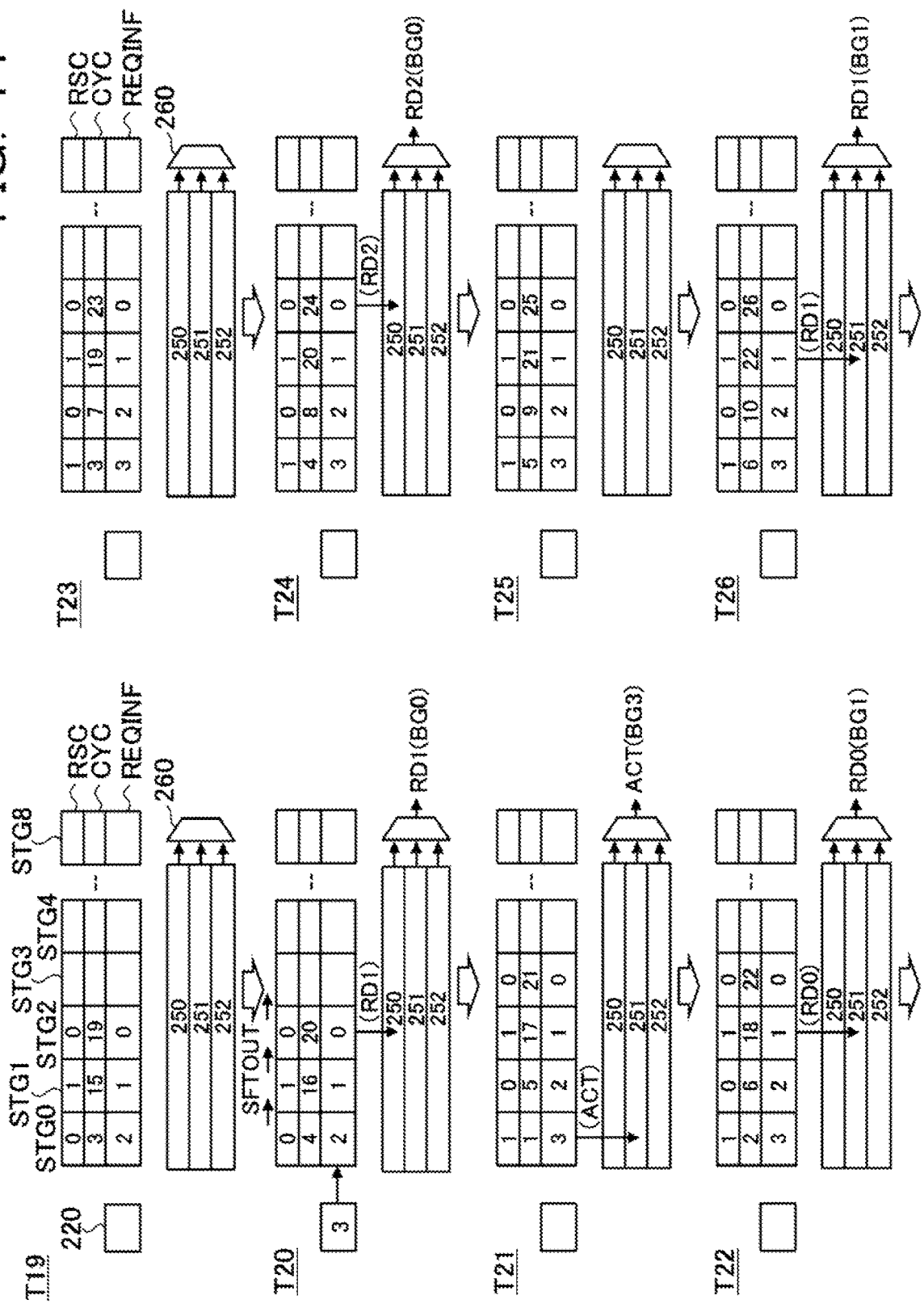
FIG. 11 is an explanatory diagram illustrating a continuation of FIG. 10.
Figure 12:
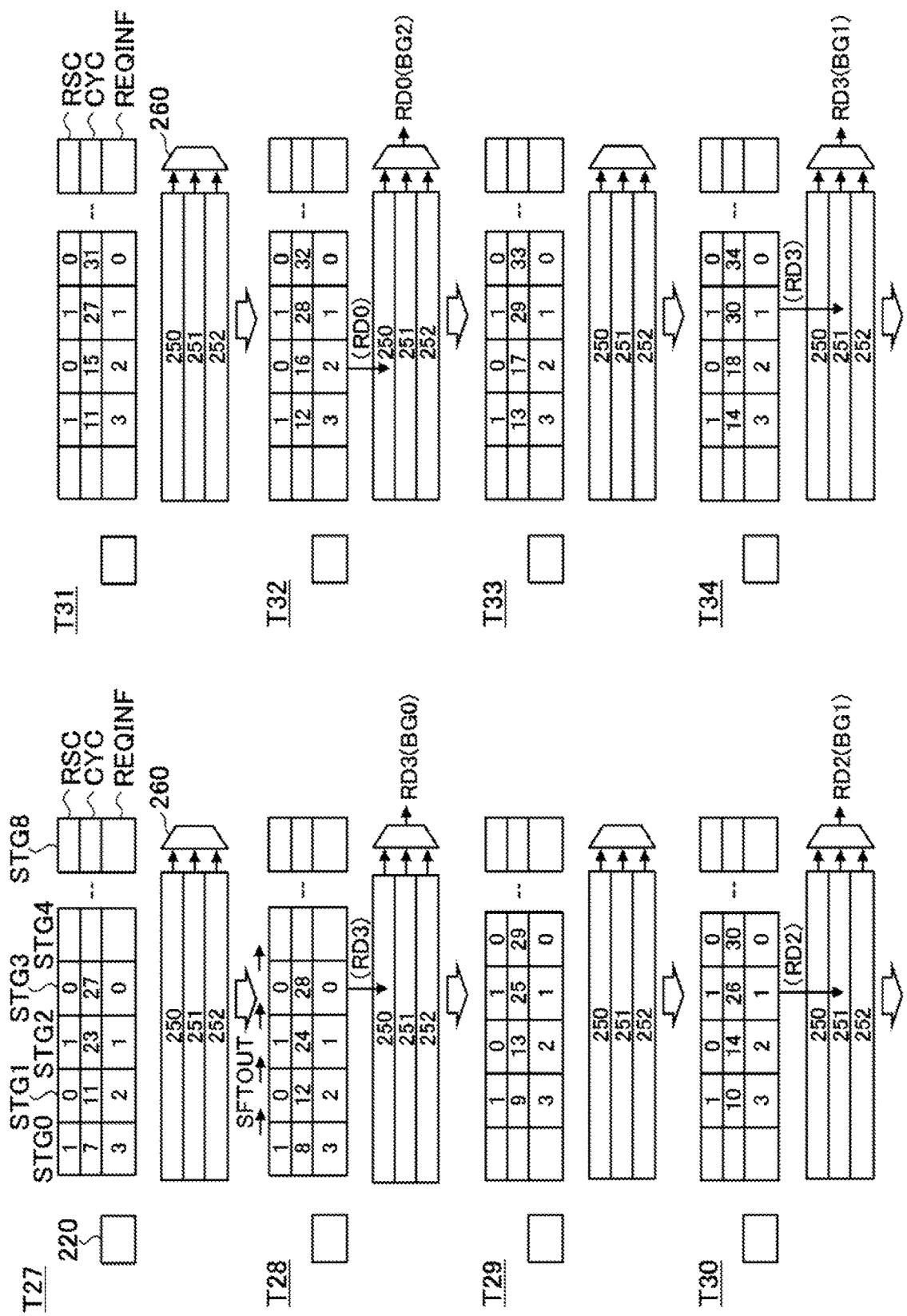
FIG. 12 is an explanatory diagram illustrating a continuation of FIG. 11.

However, as described with reference to FIG. 11, in a case where the output read command RD overlaps with the read command RD output by another processing unit 25, each of the processing units 25 executes processing of delaying the output of the read command RD. Note that each of the processing units 25 executes the processing of delaying the output also in a case where the active command ACT overlaps with the active command ACT output by another processing unit 25. Accordingly, although not illustrated in FIG. 2, each of the processing units 25 has a function of monitoring the timing at which another processing unit 25 outputs a command.

At time T17, the processing unit 250 that has received the resource number RSC=0 indicating itself from the stage STG0 outputs the active command ACT to the bank group BG2 in a similar manner to at time T1. Thereafter, from time T18 to time T19 in FIG. 11, since the stages STG0 to STG2 do not receive the shift input signal SFTIN, the states of the request information holding unit 233 and the resource number holding unit 231 are held. The elapsed cycle holding units 232 of the stages STG0 and STG2 sequentially increment the elapsed cycle CYC to set it to "3", "15", and "19", respectively.

At time T20, the processing unit 250 that has received the resource number RSC=0 indicating itself from the stage STG2 outputs the read command RD1 to the bank group BG0 as the elapsed cycle CYC=20 matches one of the column timing TCOLs. Furthermore, at time T20, the processing unit 251 that has received the resource number RSC=1 indicating itself from the stage STG2 detects that the elapsed cycle CYC=16 matches one of the column timing TCOLs. However, the processing unit 251 suspends the output of the read command RD0 to avoid overlap of the output timing of the read command RD.

Moreover, at time T20, since the counter value CNT is "4", the current resource number RSC is "0", and the conditional expression at the degree of parallelism I=2 illustrated in FIG. 3 is satisfied, the scheduling unit 220 outputs the shift signal SFTOUT0 to the stage STG0. Furthermore, the scheduling unit 220 outputs, to the request holding pipeline 230, the fourth read request 3 and the resource number RSC=1 indicating the processing in the processing unit 251.

Since the elapsed cycle CYCs of the stages STG0 to STG2 are "4", "16", and "20", respectively, and the conditional expression at the degree of parallelism I=2 illustrated in FIG. 5 is satisfied, the shift signal generation units 234 of the stages STG0 to STG2 output the shift signal SFTOUT. Accordingly, information held by the stages STG0 to STG2 is transferred to each of the stages STG1 to STG3, and the read request 3 and the resource number RSC=1 are held in the stage STG0.

At time T21, the processing unit 251 that has received the resource number RSC=1 indicating itself from the stage STG0 outputs the active command ACT to the bank group BG3 in a similar manner to at time T5. At time T22, the processing unit 251 outputs, to the bank group BG1, the read command RD0 whose output was suspended at time T20.

At time T24, the processing unit 250 that has received the resource number RSC=0 indicating itself from the stage STG3 outputs the read command RD2 to the bank group BG0 as the elapsed cycle CYC=24 matches one of the column timing TCOLs. Note that, in a similar manner to at time T20, the processing unit 251 suspends the output of the read command RD1 to the bank group BG1 to avoid overlap of the output timing of the read command RD, and outputs it at time T26.

At time T28, the elapsed cycle CYCs of the stages STG0 to STG3 become "8", "12", "24", and "28", respectively. The shift signal generation unit 234 of each of the stages STG0 to STG3 outputs the shift signal SFTOUT as it satisfies the conditional expression at the degree of parallelism I=2 illustrated in FIG. 5. Furthermore, at time T28, the processing unit 250 that has received the resource number RSC=0 indicating itself from the stage STG3 outputs the read command RD3 to the bank group BG0 as the elapsed cycle CYC=28 matches one of the column timing TCOLs. Note that, in a similar manner to at time T20 and at time T24, the processing unit 251 suspends the output of the read command RD2 to the bank group BG1 to avoid overlap of the output timing of the read command RD, and outputs it at time T30.

At time T32, the processing unit 250 that has received the resource number RSC=0 Indicating itself from the stage STG1 outputs the read command RD0 to the bank group BG2 as the elapsed cycle CYC=16 matches one of the column timing TCOLs. Note that, in a similar manner to at time T20, T24, and T28, the processing unit 251 suspends the output of the read command RD3 to the bank group BG1 to avoid overlap of the output timing of the read command RD, and outputs it at time T34.

Figure 13:
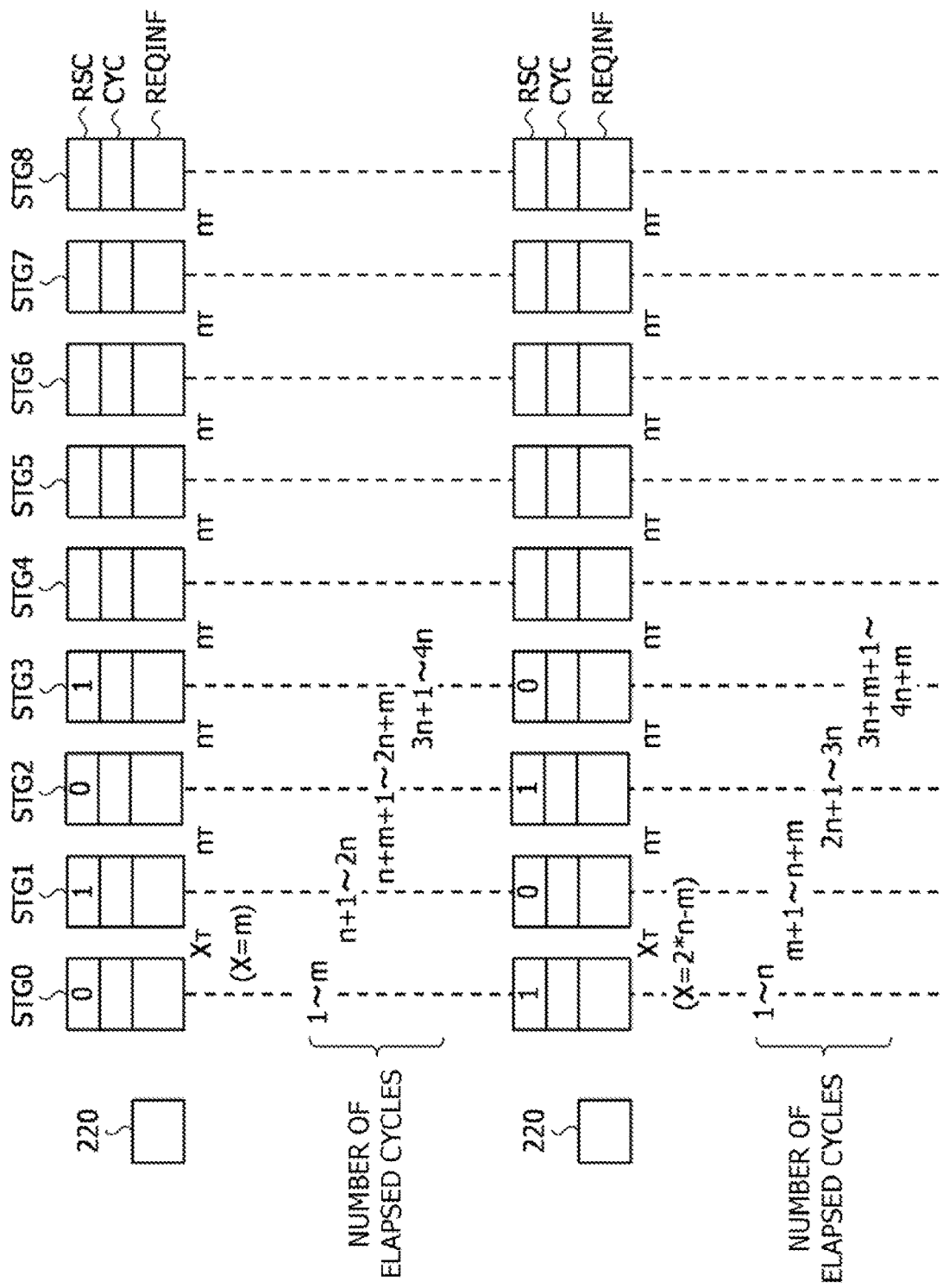
FIG. 13 is an explanatory diagram illustrating an example of the number of elapsed cycles in each stage according to a processing destination of request information held by a stage STG0 at a degree of parallelism I=2.

FIG. 13 illustrates an example of the number of elapsed cycles in each stage STG according to a processing destination of the request information held by the stage STG0 at the degree of parallelism I=2. The number of elapsed cycles (information retention period) in each stage STG differs depending on whether the resource number holding unit 231 of the stage STG0 holds "0" or holds "1".

In a case where the resource number holding unit 231 of the stage STG0 holds "0", the number of elapsed cycles (information retention period) of the stages STG0 to STG3 is "1 to m", "(n+1) to 2n", "(n+m+1) to (2n+m)", and "(3n+1) to 4n", respectively. Furthermore, the minimum interval $X_\tau$ ($\tau$ is the time of one cycle) from when the request information REQINF is input to the stage STG0 until when the next request information REQINF is input to the stage STG0 is X=m ("4" in this example).

For example, the request information REQINF corresponding to the active command ACT output to the bank group BG0 is held in the stage STG0 for four cycles (1 to m) from time T1 to time T4 in FIG. 9. The request information REQINF corresponding to the active command ACT output to the bank group BG1 is held in the stage STG1 for eight cycles ((n+1) to 2n) from time T13 (CYC=9) to time T20 (CYC=16).

Meanwhile, in a case where the resource number holding unit 231 of the stage STG0 holds "1", the number of elapsed cycles (information retention period) of the stages STG0 to STG3 is "1 to n", "(m+1) to (n+m)", "(2n+1) to 3n", and "(3n+m+1) to (4n+m)", respectively. Furthermore, the minimum interval $X_\tau$ from when the request information REQINF is input to the stage STG0 until when the next request information REQINF is input to the stage STG0 is X=2*n−m ("12" in this example).

For example, the request information REQINF corresponding to the active command ACT output to the bank group BG1 is held in the stage STG0 for eight cycles (1 to n) from time T5 (CYC=1) to time T12 (CYC=8). The request information REQINF corresponding to the active command ACT of the bank group BG0 is held in the stage STG1 for eight cycles ((m+1) to (n+m)) from time T5 (CYC=5) to time T12 (CYC=12).

FIGS. 14 to 17 illustrate exemplary operation of the memory access controller 20 in the read access of FIG. 8. Detailed description of operations similar to those in FIGS. 9 to 12 will be omitted. In FIGS. 14 to 17, memory access is executed in three parallels, whereby three processing units 250, 251, and 252 are used.

The operations from time T0 to time T3 are similar to those in FIG. 9. Since the stage STG0 does not receive the shift input signal SFTIN from time T4 to time T7, only the elapsed cycle CYC of the elapsed cycle holding unit 232 is sequentially incremented.

At time T8, the scheduling unit 220 outputs, to the request holding pipeline 230, the second read request 1 and the resource number RSC=1 indicating the processing in the processing unit 251. Furthermore, since the counter value CNT is "8", the current resource number RSC is "0", and the conditional expression at the degree of parallelism I=3 illustrated in FIG. 3 is satisfied, the scheduling unit 220 outputs the shift signal SFTOUT0 to the stage STG0. Furthermore, since the elapsed cycle CYC of the stage STG0 is "8" and the conditional expression at the degree of parallelism I=3 Illustrated in FIG. 5 is satisfied, the shift signal generation unit 234 of the stage STG0 outputs the shift signal SFTOUT.

At time T9, the processing unit 250 that has received the resource number RSC=0 indicating itself from the stage STG0 outputs the active command ACT to the bank group BG1 as the elapsed cycle CYC=1 matches the row timing TROW. Thereafter, since the stages STG0 and STG1 do not receive the shift input signal SFTIN from time T10 to time T15 in FIG. 10, only the elapsed cycle CYC of the elapsed cycle holding unit 232 is sequentially incremented.

At time T16, the elapsed cycle CYC of the stage STG0 becomes "8", and the elapsed cycle CYC of the stage STG1 becomes "16". The shift signal generation unit 234 of each of the stages STG0 and STG1 outputs the shift signal SFTOUT as it satisfies the conditional expression at the degree of parallelism I=3 illustrated in FIG. 5.

At time T16, the scheduling unit 220 outputs, to the request holding pipeline 230, the third read request 2 and the resource number RSC=2 indicating the processing in the processing unit 252. Furthermore, since the counter value CNT is "8" and the conditional expression at the degree of parallelism I=3 illustrated in FIG. 3 is satisfied, the scheduling unit 220 outputs the shift signal SFTOUT0 to the stage STG0.

At time T17, the processing unit 252 that has received the resource number RSC=2 indicating itself from the stage STG0 outputs the active command ACT to the bank group BG2 in a similar manner to at time T9. Thereafter, since the stages STG0 and STG2 do not receive the shift input signal SFTIN from time T18 to time T24, only the elapsed cycle CYC of the elapsed cycle holding unit 232 is sequentially incremented.

At time T24, since the counter value CNT is "8" and the conditional expression at the degree of parallelism I=3 illustrated in FIG. 3 is satisfied, the scheduling unit 220 outputs the shift signal SFTOUT0 to the stage STG0. Furthermore, the scheduling unit 220 outputs, to the request holding pipeline 230, the fourth read request 3 and the resource number RSC=0 indicating the processing in the processing unit 250.

At time T24, the elapsed cycle CYCs of the stages STG0, STG1, and STG2 become "8", "16", and "24", respectively. The shift signal generation unit 234 of each of the stages STG0 to STG2 outputs the shift signal SFTOUT as it satisfies the conditional expression at the degree of parallelism I=3 illustrated in FIG. 5.

Furthermore, at time T24, the scheduling unit 220 outputs, to the request holding pipeline 230, the third read request 2 and the resource number RSC=2 indicating the processing in the processing unit 252. Since the counter value CNT is "8" and the conditional expression at the degree of parallelism I=3 is satisfied, the scheduling unit 220 outputs the shift signal SFTOUT0 to the stage STG0.

At time T25, the processing unit 250 that has received the resource number RSC=0 indicating itself from the stage STG0 outputs the active command ACT to the bank group BG3 in a similar manner to at time T1. Furthermore, at time T25, the processing unit 250 that has received the resource number RSC=0 indicating itself from the stage STG3 outputs the read command RD0 to the bank group BG0 as the elapsed cycle CYC=25 matches one of the column timing TCOLs. As described with reference to FIGS. 7 and 8, each of the processing units 25 may output the active command ACT and the read command RD in the same cycle.

Note that, in the case of the degree of parallelism I=3, four column timing TCOLs (CYC25, CYC31, CYC37, CYC43) are prepared corresponding to the read commands RD0, RD1, RD2, and RD3 illustrated in FIG. 7. In this manner, the column timing TCOL is set for each degree of parallelism I.

Figure 16:
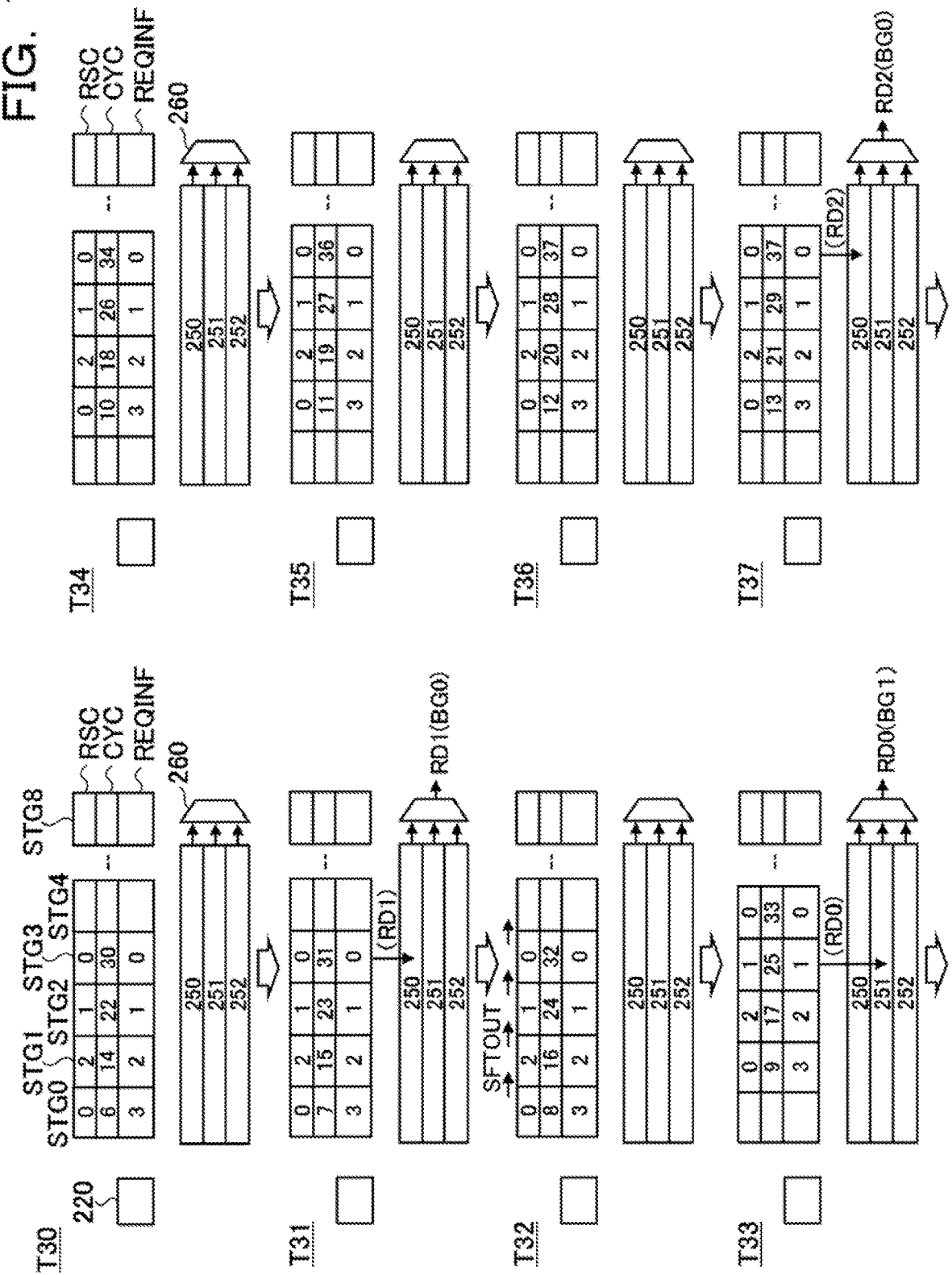
FIG. 16 is an explanatory diagram illustrating a continuation of FIG. 15.

Thereafter, since the stages STG0 to STG3 do not receive the shift input signal SFTIN from time T26 to time T30 in FIG. 16, only the elapsed cycle CYC of the elapsed cycle holding unit 232 is sequentially incremented. At time T31, the processing unit 250 that has received the resource number RSC=0 indicating itself from the stage STG3 outputs the read command RD1 to the bank group BG0 as the elapsed cycle CYC=31 matches one of the column timing TCOLs.

At time T32, the elapsed cycle CYCs of the stages STG0 to STG3 become "8", "16", "24", and "32", respectively. The shift signal generation units 234 of each of the stages STG0 to STG3 outputs the shift signal SFTOUT as it satisfies the conditional expression at the degree of parallelism I=3 illustrated in FIG. 5. At time T33, the processing unit 251 that has received the resource number RSC=1 indicating itself from the stage STG3 outputs the read command RD0 to the bank group BG1 as the elapsed cycle CYC=25 matches one of the column timing TCOLs.

Figure 17:
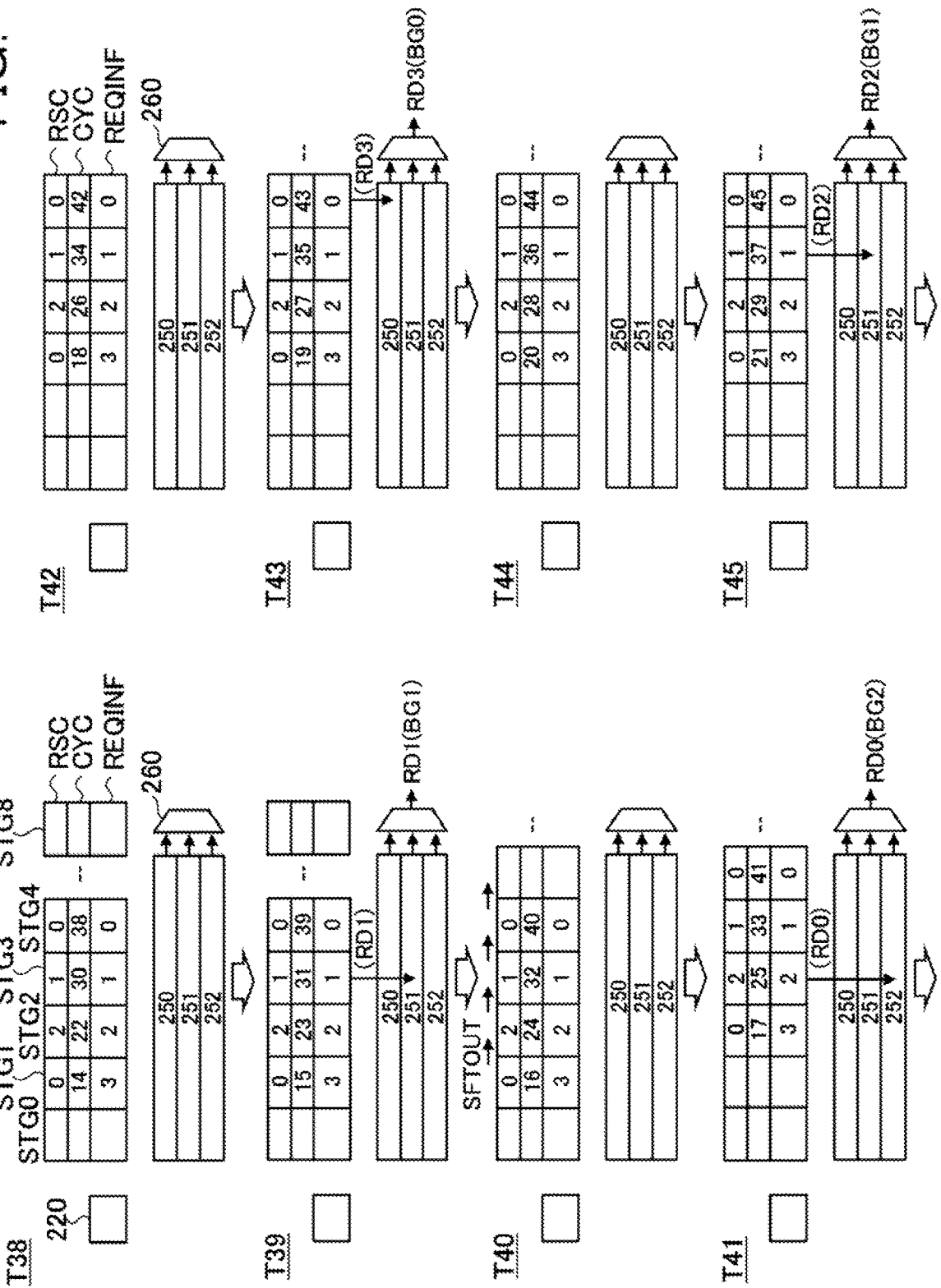
FIG. 17 is an explanatory diagram illustrating a continuation of FIG. 16.

Thereafter, since the stages STG1 to STG4 do not receive the shift input signal SFTIN from time T34 to time T39 in FIG. 17, only the elapsed cycle CYC of the elapsed cycle holding unit 232 is sequentially incremented. The stage STG0 does not operate as it has not received the request information REQINF. At time T37, the processing unit 250 that has received the resource number RSC=0 indicating itself from the stage STG4 outputs the read command RD2 to the bank group BG0 as the elapsed cycle CYC=37 matches one of the column timing TCOLs.

At time T40, the elapsed cycle CYCs of the stages STG1 to STG4 become "16", "24", "32", and "40", respectively. The shift signal generation unit 234 of each of the stages STG1 to STG4 outputs the shift signal SFTOUT as it satisfies the conditional expression at the degree of parallelism I=3 illustrated in FIG. 5. At time T41, the processing unit 252 that has received the resource number RSC=2 indicating itself from the stage STG3 outputs the read command RD0 to the bank group BG2 as the elapsed cycle CYC=25 matches one of the column timing TCOLs.

Thereafter, since the stages STG2 to STG5 do not receive the shift input signal SFTIN from time T42 to time T45, only the elapsed cycle CYC of the elapsed cycle holding unit 232 is sequentially incremented. The stages STG0 and STG1 do not operate as they have not received the request information REQINF. At time T45, the processing unit 251 that has received the resource number RSC=1 indicating itself from the stage STG4 outputs the read command RD2 to the bank group BG1 as the elapsed cycle CYC=37 matches one of the column timing TCOLs.

Figure 18:
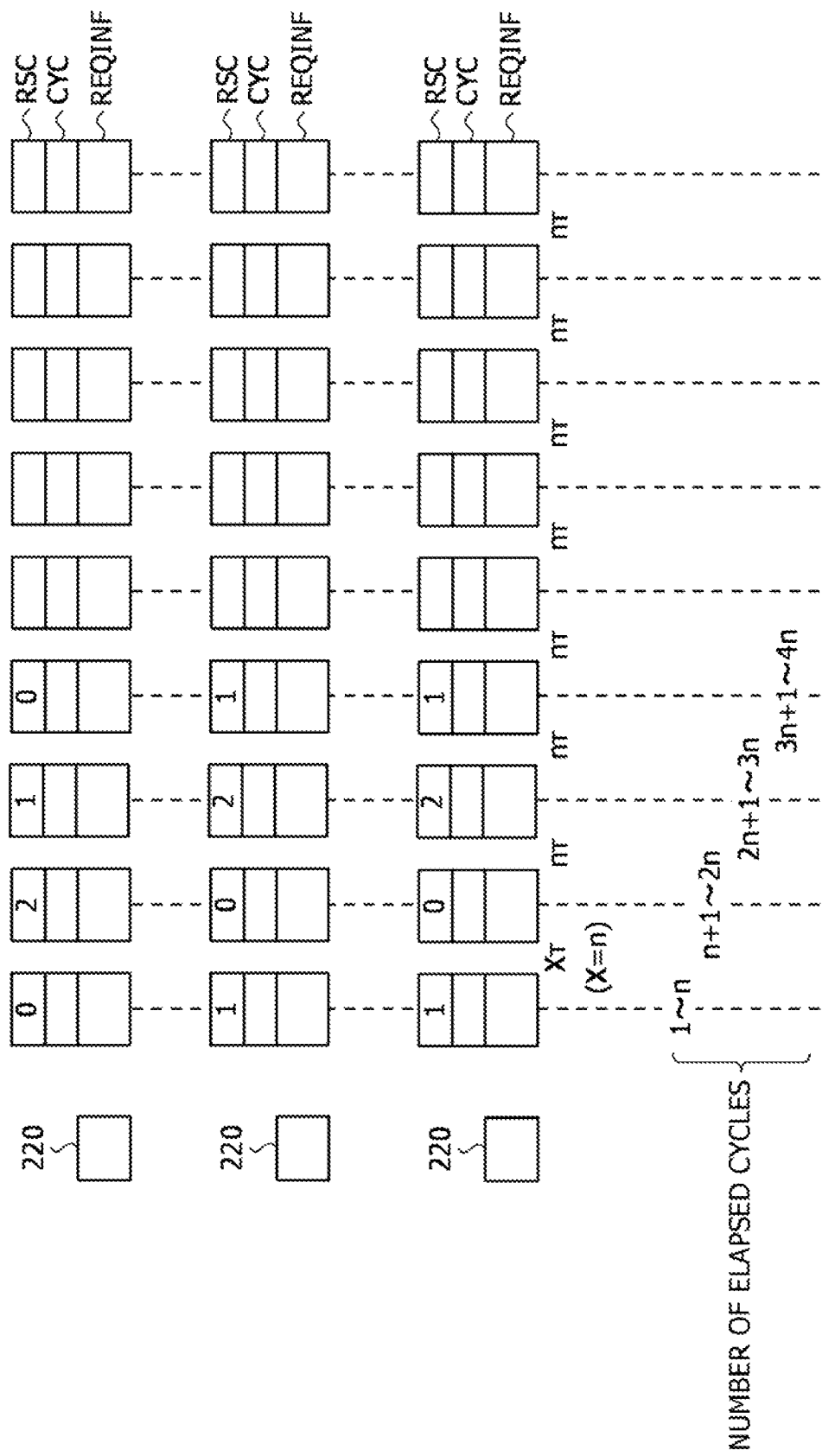
FIG. 18 is an explanatory diagram illustrating an example of the number of elapsed cycles in each stage according to a processing destination of the request information held by the stage STG0 at a degree of parallelism I=3.

FIG. 18 illustrates an example of the number of elapsed cycles in each stage STG according to a processing destination of the request information held by the stage STG0 at the degree of parallelism I=3. Detailed description of elements similar to those in FIG. 13 will be omitted. In the case of the degree of parallelism I=3, the number of elapsed cycles (information retention period) in each stage STG is the same.

The number of elapsed cycles (information retention period) of stages STG0 to STG3 is "1 to n", "(n+1) to 2n", "(2n+1) to 3n", and "(3n+1) to 4n", respectively. Furthermore, the minimum interval $X_\tau$ ($\tau$ is the time of one cycle) from when the request information REQINF is input to the stage STG0 until when the next request information REQINF is input to the stage STG0 is X=n ("8" in this example).

Figure 14:
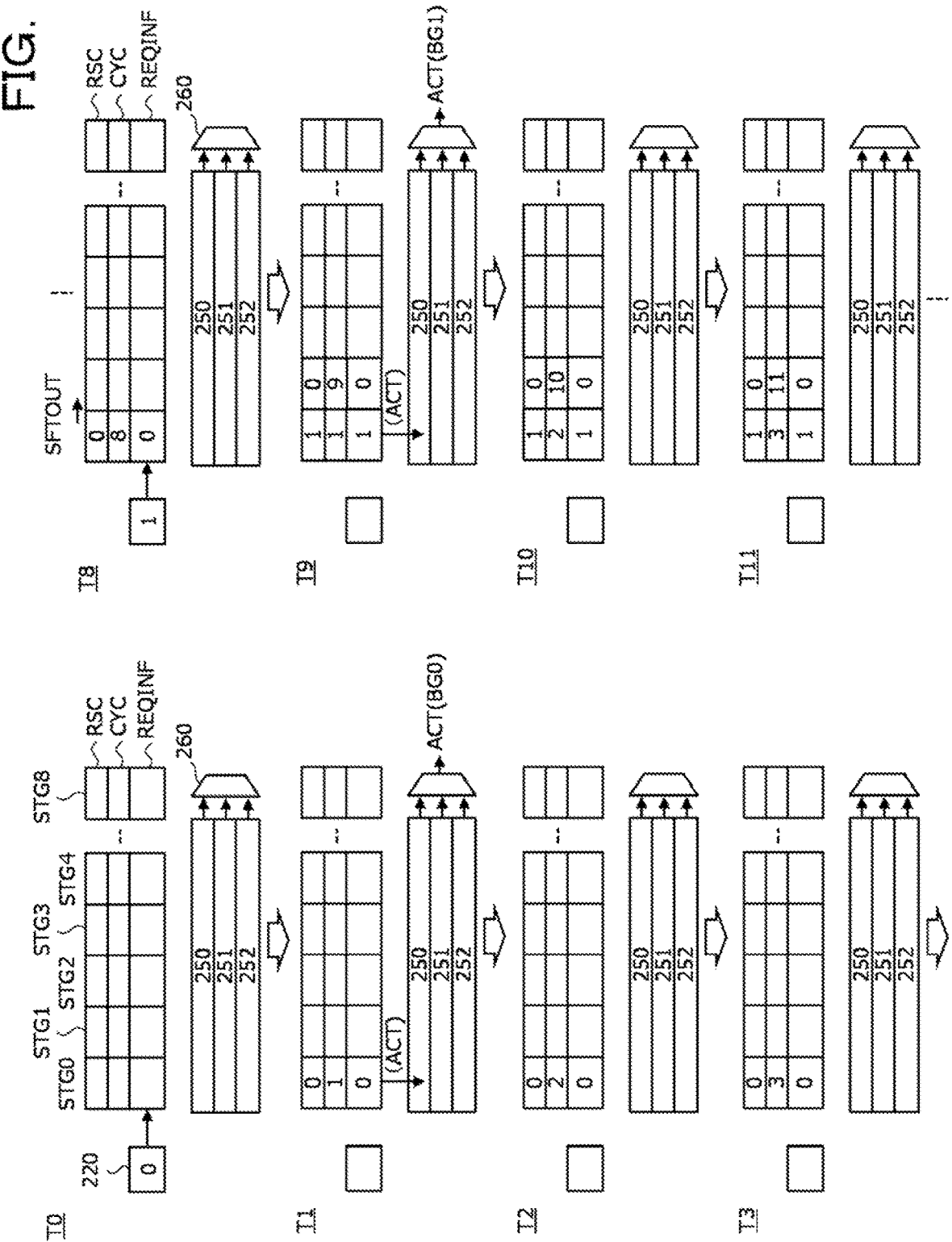
FIG. 14 is an explanatory diagram illustrating exemplary operation of the memory access controller in the read access of FIG. 8.

For example, one request information REQINF is held in the stage STG0 for eight cycles (1 to n) from time T1 to time T8 in FIG. 14. One request information REQINF is held in the stage STG1 for eight cycles ((n+1) to 2n) from time T9 in FIG. 14 to time T16 in FIG. 15.

Figure 15:
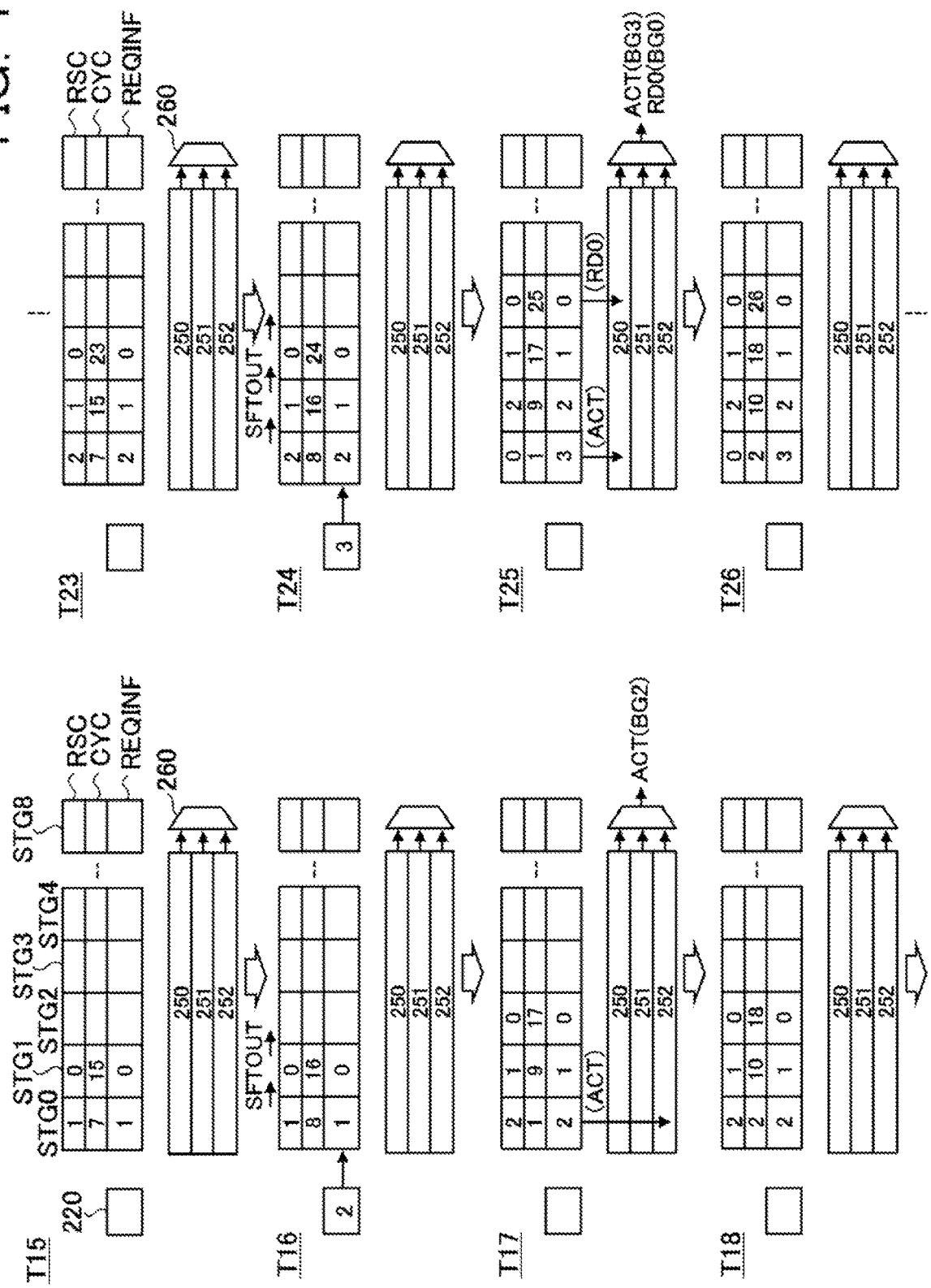
FIG. 15 is an explanatory diagram illustrating a continuation of FIG. 14.

One request information REQINF is held in the stage STG2 for eight cycles ((2n+1) to 3n) from time T17 to time T24 in FIG. 15. One request information REQINF is held in the stage STG3 for eight cycles ((3n+1) to 4n) from time T25 in FIG. 15 to time T32 in FIG. 16.

Figure 19:
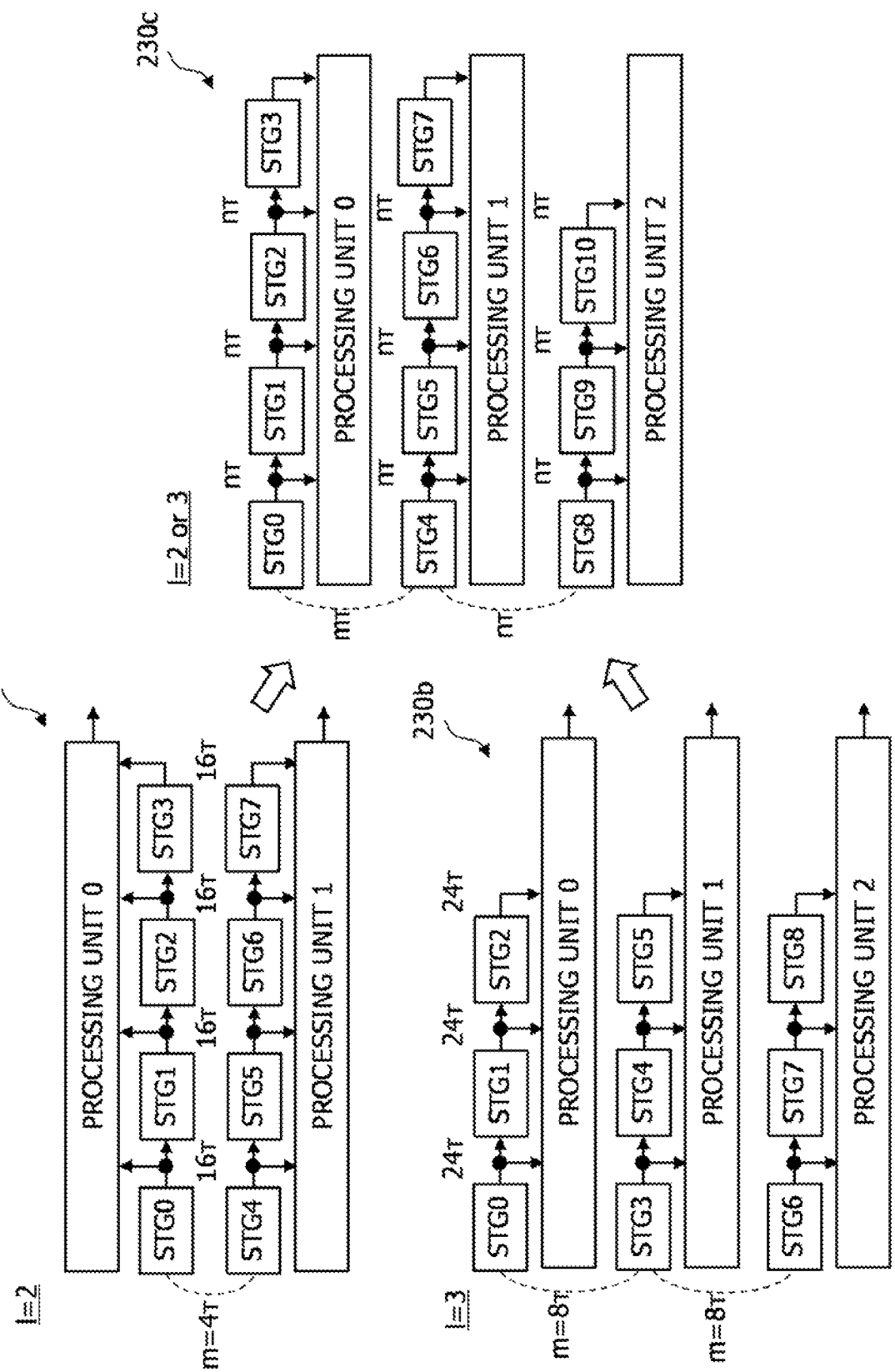
FIG. 19 is an explanatory diagram illustrating an example (comparative example) of a configuration of a request holding pipeline of another memory access controller.

FIG. 19 illustrates an example (comparative example) of a configuration of a request holding pipeline of another memory access controller. The average request interval n is assumed to be "8".

For example, a request holding pipeline 230a, which includes two processing units 0 and 1 to output an access command at the degree of parallelism I=2, has four stages STGs (STG0 to STG3 and STG4 to STG7) connected in series for each of the processing units 0 and 1. A configuration of each of the processing units 0 and 1 is similar to the configuration of the processing unit 25 illustrated in FIG. 6 except that the number of stages STGs to be connected is smaller.

The number of elapsed cycles (information retention period) of each of the stages STG0 to STG7 is $16_\tau$. The phase difference m, which is a delay time from the input of the request information REQINF to the stage STG0 to the input of the request information REQINF to the stage STG4, is set to $4_\tau$. As a result, the memory access controller including the request holding pipeline 230a may implement the operation illustrated in FIG. 7.

Furthermore, for example, a request holding pipeline 230b, which includes three processing units 0, 1, and 2 to output an access command at the degree of parallelism I=3, has three stages STGs connected in series for each of the processing units 0, 1, and 2. For example, the stages STG0 to STG2 are connected to the processing unit 0, the stages STG3 to STG5 are connected to the processing unit 1, and the stages STG6 to STG8 are connected to the processing unit 2. A configuration of each of the processing units 0, 1, and 2 is similar to the configuration of the processing unit 25 illustrated in FIG. 6 except that the number of stages STGs to be connected is smaller.

The number of elapsed cycles (information retention period) of each of the stages STG0 to STG8 is $24_\tau$. The phase difference m, which is a delay time from the input of the request information REQINF to the stage STG0 to the input of the request information REQINF to the stage STG3, is set to $8_\tau$. Furthermore, the phase difference m, which is a delay time from the input of the request information REQINF to the stage STG3 to the input of the request information REQINF to the stage STG6, is set to $8_\tau$. As a result, the memory access controller including the request holding pipeline 230b may implement the operation illustrated in FIG. 8.

A request holding pipeline 230c, which enables output of an access command both at the degree of parallelism I=2 and the degree of parallelism I=3, is achieved by combination of the request holding pipelines 230a and 230b. In this case, the request holding pipeline 230c has four stages STGs (STG0 to STG3 and STG4 to STG7) connected in series for each of the processing units 0 and 1, and has three stages STGs (STG8 to STG10) connected in series corresponding to the processing unit 2.

The number of elapsed cycles $n_\tau$ of each of the stages STG0 to STG10 is set to $16_\tau$ in the case of the degree of parallelism I=2, and is set to $24_\tau$ in the case of the degree of parallelism I=3. Furthermore, the delay time from the input of the request information REQINF to the stage STG0 to the input of the request information REQINF to the stage STG4 is set to $m_T$. A value of m is set to "4" in the case of the degree of parallelism I=2, and is set to "8" in the case of the degree of parallelism I=3. In the case of the degree of parallelism I=3, the delay time from the input of the request information REQINF to the stage STG4 to the input of the request information REQINF to the stage STG8 is set to $n_\tau$ (n=8).

The number of stages STGs of the request holding pipeline 230c that enables output of an access command both at the degree of parallelism I=2 and the degree of parallelism I=3 is 11, which is two more than the number of stages STGs (nine) of the request holding pipeline 230 of FIG. 2. In other words, for example, the circuit scale of the request holding pipeline 230 of FIG. 2 may be made smaller than that of the request holding pipeline 230c. As a result, it becomes possible to reduce the chip size of the CPU 10 equipped with the memory access controller 20 including the request holding pipeline 230.

As described above, according to the embodiment described above, it becomes possible to achieve the memory access with different degrees of parallelism I using one series of shift registers of the request holding pipeline 230. As a result, it becomes possible to reduce the circuit scale of the memory access controller 20, and to reduce the circuit scale of the CPU 10 equipped with the memory access controller 20 as compared with the case of using a plurality of series of shift registers.

The scheduling unit 220 may change the maximum value of the counter value CNT on the basis of the degree of parallelism I, the phase difference m, and the average request interval n set according to the specifications of the memory 30 to be connected to the CPU 10, and the current resource number NXTRSC. In addition, the scheduling unit 220 may output the shift signal SFTOUT0 at a desired timing based on the counter value CNT whose maximum value is variable, and may update the resource number NXTRSC according to the output of the shift signal SFTOUT0.

Each stage STG of the request holding pipeline 230 may hold the number of cycles since reception of the request information REQINF in the stage STG0 with the elapsed cycle holding unit 232, and may output the held number of cycles to each of the processing units 25. As a result, each of the processing units 25 may determine the output timing of the access command to the memory 30 based on the number of cycles from each stage STG.

Even in a case where the reception interval of the request information REQINF (supply interval of the active command ACT in FIG. 7) of the stage STG0 is not a fixed interval, the output timing of the shift signal SFTOUT of each stage STG may be aligned. As a result, it becomes possible to suppress collision of the request information REQINF and the like in the request holding pipeline 230, and to suppress a malfunction even in a case where the reception interval of the request information REQINF in the stage STG0 is not a fixed interval.

Even in a case where the output cycle of the access command differs depending on the degree of parallelism I, each of the processing units 25 may output the access command to the memory 30 at the correct timing on the basis of the degree of parallelism I, the resource number RSC, and the elapsed cycle CYC.

From the above detailed description, characteristics and advantages of the embodiment will become apparent. This is intended to cover the characteristics and advantages of the embodiment described above without departing from the spirit and the scope of the claims. Furthermore, any person having ordinary knowledge in the technical field can be easily come up with various Improvements and modifications. Therefore, there is no Intention to limit the scope of the inventive embodiment to those described above, and the scope of the inventive embodiment can rely on appropriate improvements and equivalents included in the scope disclosed in the embodiment.

All examples and conditional language provided herein are intended for the pedagogical purposes of aiding the reader in understanding the invention and the concepts contributed by the Inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processor comprising: a processor configured to execute calculation; and a memory access controller configured to control access of a memory based on a memory access request output by the processor, wherein the memory access controller includes: a memory access receiving circuit configured to output, at a time interval according to an operation mode, a first shift signal, any of a plurality of resource numbers, and the memory access request received from the processor, a shift register configured to shift the resource number and the memory access request from a first stage included in a plurality of stages to a second stage as a subsequent stage of the first stage at a timing according to the operation mode, the first stage is received based on the first shift signal the resource number and the memory access request, and a plurality of memory access transmitting circuits configured to receive the resource number and the memory access request held by the plurality of stage, wherein each of the plurality of memory access transmitting circuits provided corresponding to the plurality of resource number, and the plurality of memory access transmitting circuits output, to the memory, an access command corresponding to the memory access request when the received resource number matches a resource number of a memory access transmitting circuits included in the plurality of memory access transmitting circuits.

2. The arithmetic processor according to claim 1, wherein
the memory access receiving circuit outputs the first shift signal at a time interval determined based on an average output interval of the access command to the memory, a minimum output interval of the access command to the memory, and the operation mode.

3. The arithmetic processor according to claim 2, wherein the memory access receiving circuit further includes:
a clock counter configured to count a clock, and
the memory access receiving circuit is further configured to:
output the first shift signal when a counter value output by the clock counter becomes a value determined by the average output interval, the minimum output interval, and the operation mode,
alternately output the plurality of resource numbers based on the first shift signal, and
sequentially output the memory access request received based on the first shift signal.

4. The arithmetic processor according to claim 2, wherein each of the plurality of stages are further configured to:
hold the resource number and the memory access request,
hold a number of cycles from when the memory access request is received in the first stage, and
output a second shift signal when the number of cycles becomes a value determined by the average output interval, the minimum output interval, the operation mode, and a position of the stage.

5. The arithmetic processor according to claim 4, wherein each of the plurality of stages other than the first stage are further configured to:
sequentially updates the held number of cycles while the stage of a previous stage does not output the second shift signal.

6. The arithmetic processor according to claim 5, wherein each of the plurality of memory access transmitting circuits is further configured to:
sequentially output, to the memory, a plurality of a access commands including the access command in response to the memory access request, and output a corresponding access command to the memory when the number of cycles held in a stage included in the plurality of stages that outputs the resource number matching the resource number of the memory access transmitting circuit indicates an output cycle of any of the plurality of access commands determined according to the operation mode.

7. The arithmetic processor according to claim 1, wherein the operation mode indicates a number of the memory access transmitting circuit that operate in parallel, and
a total number of the resource numbers output differs depending on the operation mode.

8. The arithmetic processor according to claim 1, wherein the operation mode is changed according to an operating frequency of the memory.

9. The arithmetic processor according to claim 1, wherein the access command includes an active command that selects any of a plurality of word lines included in the memory, and a read command or a write command that selects a predetermined number of a plurality of memory cells connected to the selected word line.

10. An arithmetic processor comprising:
a cache configured to output a memory access request; and
a memory access controller configured to control access of a memory based on the memory access request output by the processor, wherein
the memory access controller includes:
a memory access receiving circuit configured to output, at a time interval according to an operation mode, a first shift signal, any of a plurality of resource numbers, and the memory access request received from the processor,
a shift register configured to shift the resource number and the memory access request from a first stage included in a plurality of stages to a second stage as a subsequent stage of the first stage at a timing according to the operation mode, the first stage is received based on the first shift signal the resource number and the memory access request, and
a plurality of memory access transmitting circuits configured to receive the resource number and the memory access request held by the plurality of stage, wherein
each of the plurality of memory access transmitting circuits provided corresponding to the plurality of resource number, and
the plurality of memory access transmitting circuits output, to the memory, an access command corresponding to the memory access request when the received resource number matches a resource number of a memory access transmitting circuits included in the plurality of memory access transmitting circuits.

11. An arithmetic apparatus comprising:
a cache configured to output a memory access request; and
a memory access controller configured to control access of a memory based on the memory access request output by the cache, wherein
the memory access controller is further configured to:
output, at a time interval according to an operation mode, a first shift signal, any of a plurality of resource numbers, and the memory access request received from the processor,
shift the resource number and the memory access request from a first stage included in a plurality of stages to a second stage as a subsequent stage of the first stage at a timing according to the operation mode, the first stage is received based on the first shift signal the resource number and the memory access request
receive the resource number and the memory access request held by the plurality of stage;
output, to the memory, an access command corresponding to the memory access request when the received resource number is satisfied a condition.

12. The arithmetic apparatus according to claim 11, wherein the memory access controller includes: a plurality of memory access transmitters configured to output, to the memory, the access command, wherein each of the plurality of access transmitter provided corresponding to the plurality of resource number, and the plurality of access transmitters outputs, to the memory, the access command when the received resource number matches a resource number of a memory access transmitters included in the plurality of access transmitters.

* * * * *